(12) United States Patent
Niinomi et al.

(10) Patent No.: US 9,783,214 B2
(45) Date of Patent: Oct. 10, 2017

(54) OPERATION MANAGEMENT DEVICE, OPERATION MANAGEMENT METHOD, VEHICLE, VEHICULAR TRAFFIC SYSTEM, AND PROGRAM

(71) Applicant: MITSUBISHI HEAVY INDUSTRIES, LTD., Tokyo (JP)

(72) Inventors: Toshihiko Niinomi, Tokyo (JP); Kenji Takao, Tokyo (JP); Noritaka Yanai, Tokyo (JP); Yasuyuki Suzuki, Tokyo (JP); Yutaka Miyajima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 45 days.

(21) Appl. No.: 14/763,155

(22) PCT Filed: Jan. 29, 2014

(86) PCT No.: PCT/JP2014/051962
§ 371 (c)(1),
(2) Date: Jul. 23, 2015

(87) PCT Pub. No.: WO2014/192328
PCT Pub. Date: Dec. 4, 2014

(65) Prior Publication Data
US 2015/0360705 A1    Dec. 17, 2015

(30) Foreign Application Priority Data
May 30, 2013    (JP) .................................. 2013-114553

(51) Int. Cl.
*B61L 27/00* (2006.01)
*B60L 15/40* (2006.01)
(Continued)

(52) U.S. Cl.
CPC .......... *B61L 27/0011* (2013.01); *B60L 15/40* (2013.01); *B61L 25/02* (2013.01); *B61L 27/0027* (2013.01);
(Continued)

(58) Field of Classification Search
None
See application file for complete search history.

(56) References Cited

U.S. PATENT DOCUMENTS

2011/0098908 A1*  4/2011  Chun .................... B61B 1/00
701/117

FOREIGN PATENT DOCUMENTS

JP  11-245820 A   9/1999
JP  2005-280637 A  10/2005
(Continued)

OTHER PUBLICATIONS

International Search Report mailed Apr. 1, 2014, corresponding to International Patent Application No. PCT/JP2014/051962.
(Continued)

*Primary Examiner* — Angela Ortiz
*Assistant Examiner* — Garrett Evans
(74) *Attorney, Agent, or Firm* — Kanesaka Berner and Partners LLP

(57) ABSTRACT

An operation management device that manages the operation of a plurality of vehicles that travel along a track is provided with: a vehicle position acquisition unit that acquires the positions of the plurality of vehicles that are present on the track; a density calculation unit that calculates the density of the plurality of vehicles that are traveling along the track within a predetermined range; and a departure determination unit that adjusts the departure time of a target vehicle from a station at which the vehicle stops on the
(Continued)

basis of a front direction density indicating the density of vehicles that are traveling within a predetermined range in front of the predetermined target vehicle in the travel direction thereof and a back direction density indicating the density of vehicles that are traveling within a predetermined range in back of the predetermined target vehicle in the travel direction thereof.

12 Claims, 23 Drawing Sheets

(51) Int. Cl.
   *B61L 25/02* (2006.01)
   *B61L 15/00* (2006.01)
(52) U.S. Cl.
   CPC ....... *B61L 27/0077* (2013.01); *B61L 27/0083* (2013.01); *B61L 15/0027* (2013.01)

(56) References Cited

FOREIGN PATENT DOCUMENTS

| | | |
|---|---|---|
| JP | 2006-218996 A | 8/2006 |
| JP | 2010-89639 A | 4/2010 |
| JP | 2010-228688 A | 10/2010 |
| JP | 2012-240543 A | 12/2012 |
| JP | 2014-139052 | 7/2014 |

OTHER PUBLICATIONS

Written Opinion mailed Apr. 1, 2014, corresponding to International Patent Application No. PCT/JP2014/051962.
Office Action in SG Application No. 11201505638V, dated Sep. 8, 2016.

* cited by examiner

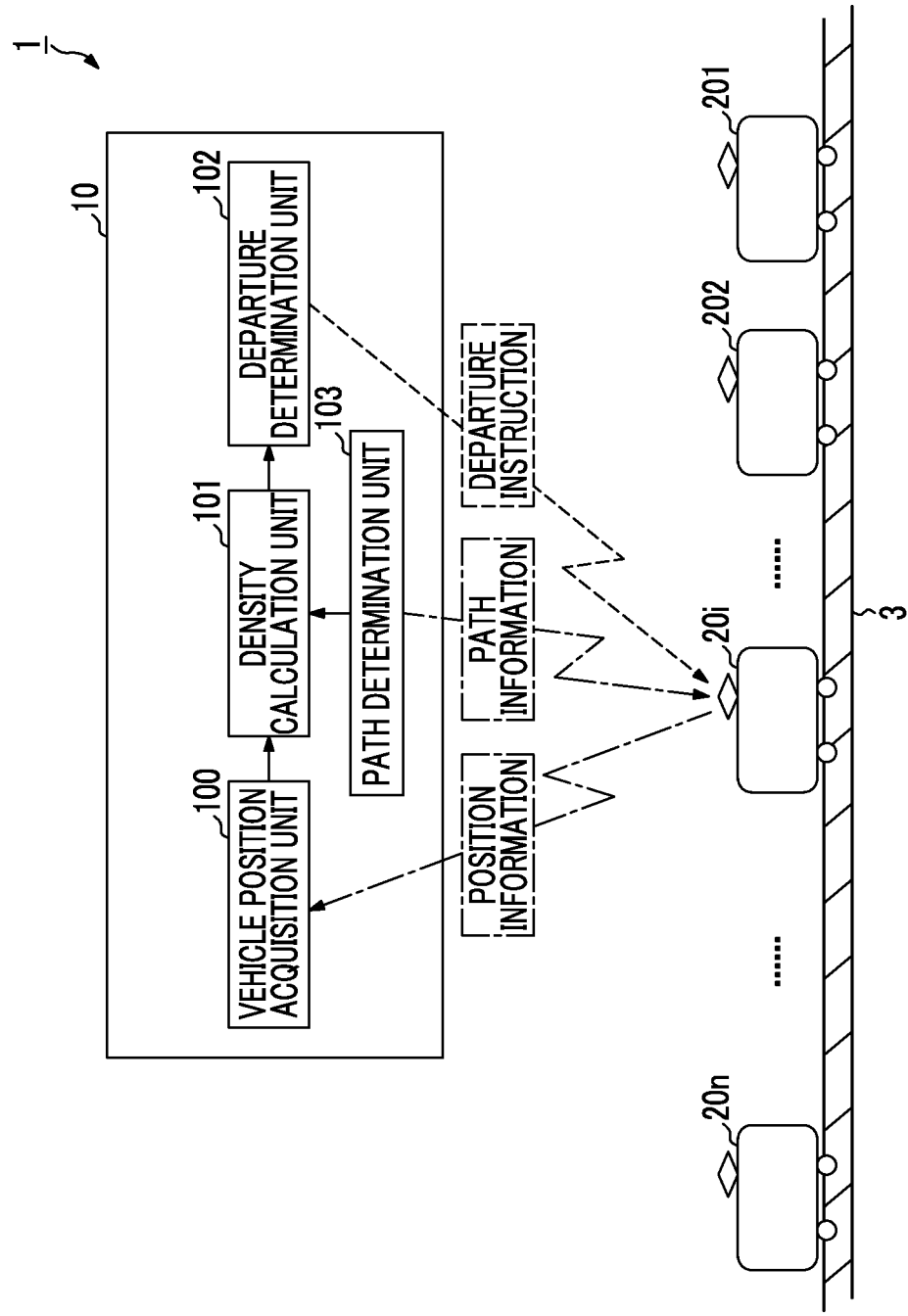

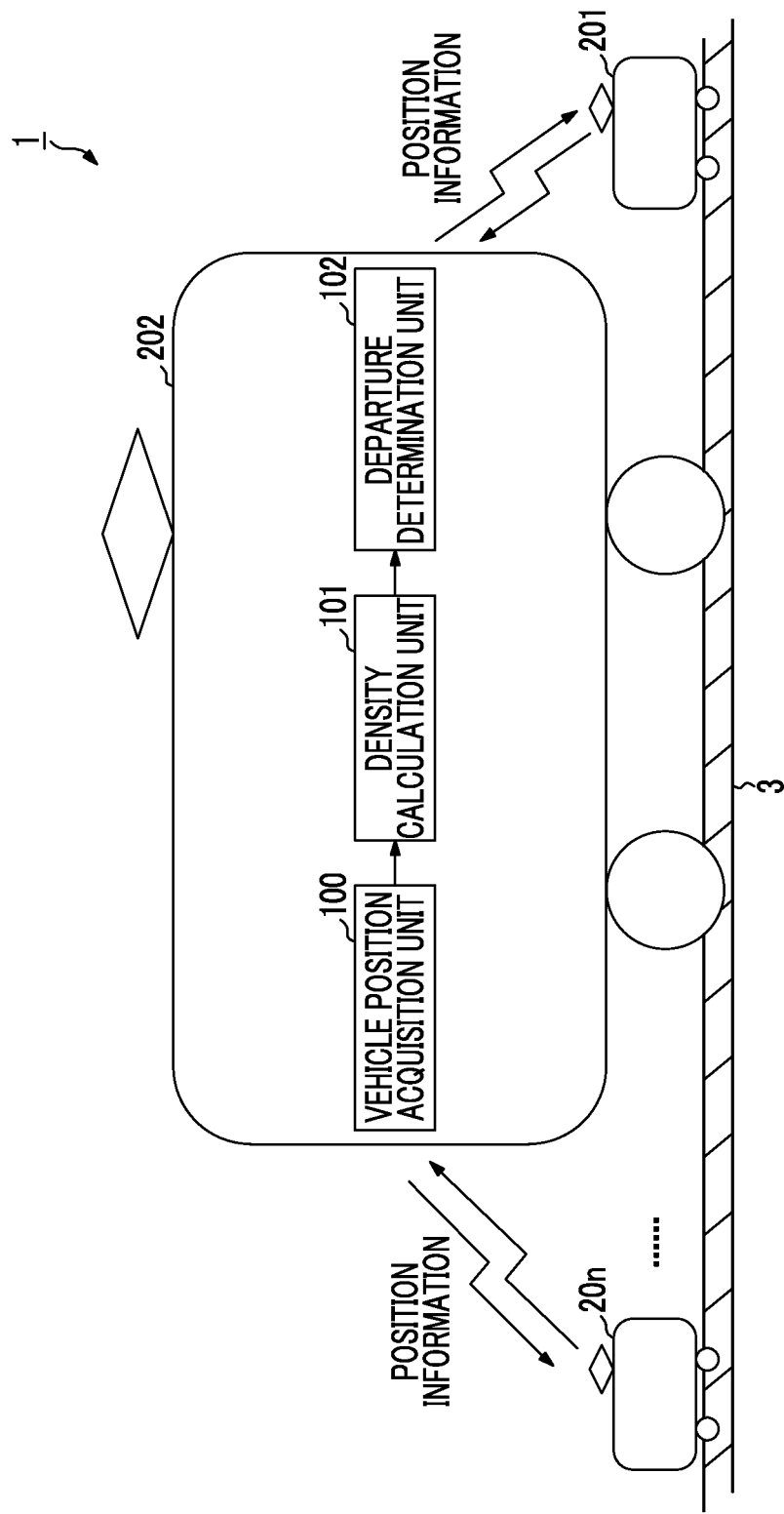

OPERATION MANAGEMENT DEVICE, OPERATION MANAGEMENT METHOD, VEHICLE, VEHICULAR TRAFFIC SYSTEM, AND PROGRAM

RELATED APPLICATIONS

The present application is a National Phase of International Application Number PCT/JP2014/051962, filed Jan. 29, 2014, which claims priority to Japanese Application Number 2013-114553, filed May 30, 2013.

TECHNICAL FIELD

The present invention relates to a vehicle traveling along a track, an operation management device that manages an operation of a vehicle, a vehicular traffic system including the vehicle and the operation management device, an operation management method, and a program. Priority is claimed on Japanese Patent Application No. 2013-114553, filed May 30, 2013, the content of which is incorporated herein by reference.

BACKGROUND ART

In a conventional vehicular traffic system that provides a transportation service using vehicles (for example, a train) traveling along a predetermined track (line), the operation of each vehicle is managed on the basis of a predefined timetable. Specifically, the operation management device that is a so-called ground facility outputs an instruction to each vehicle based on an arrival time, a departure time, and the like determined for each vehicle, and the vehicle operates according to the instruction. In operation control based on such a timetable, the timetable is changed when the operation is disturbed, and the vehicles operate according to the changed timetable to achieve elimination of the service disruption. This timetable change is advanced work that requires securing of rationality, and effort and time are accordingly required. Further, the time is not only simply consumed, but also reasonably performing timetable changing work requires a lot of experience. Measures are limited according to the abundance of the experience. In particular, this trend is significant in cities in emerging countries where there is no railway.

Meanwhile, in recent years, with the significant development of information transfer means and the establishment of an information transfer method and facilities between an operation management system and a vehicle and between a vehicle and a vehicle, an environment in which a cooperation operation between the operation management system and the vehicle or a cooperation operation between the vehicles is possible can be built. Further, high performance of information processing means is significant, and the vehicle, the ground facility, and an individual device can perform independent information processing and control operation within a range of individual discretion.

For example, according to a train operation control method described in PTL 1, when a time delay of another vehicle is equal to or greater than a predetermined value, a departure time of the own vehicle is determined while vehicle spacing between the other vehicle and the own vehicle is autonomously adjusted.

CITATION LIST

Patent Literature

[PTL 1] Japanese Unexamined Patent Application Publication No. 2010-228688

SUMMARY OF INVENTION

Technical Problem

Here, according to the train operation control method described in PTL 1, the vehicle spacing between the own vehicle and the other vehicle is controlled only when the delay is short, and the timetable is separately changed when the delay is long. However, since changing the timetable requires effort and time, it may take more time to recover the timetable when the delay is long.

Further, according to the train operation control method described in PTL 1, in particular, a scheme of controlling the vehicle spacing with one front or rear vehicle is included. Each of a plurality of vehicles performs an operation (recovery operation) to adjust the time interval between the vehicle and a nearest vehicle traveling in front and rear of the vehicle, and thus, the time interval of the vehicle is uniformized as a whole vehicular traffic system.

However, in the method in which each vehicle controls the time interval between the vehicle and one front or rear vehicle, it is not sufficient to uniformize the time intervals of the vehicles most rapidly as the whole vehicular traffic system, and it takes time until nonuniform time intervals of the vehicles are completely eliminated after a delay of the vehicle occurs. Accordingly, when provision of a transportation service using vehicles becomes nonuniform due to a delay in a specific vehicle, it may take time until the return to a state in which a uniform transportation service can be provided.

Further, in PTL 1, the vehicle spacing is controlled on the basis of delay time information of each vehicle. In this case, adjustment is difficult when a plurality of vehicles are simultaneously delayed. For example, when one of the delayed vehicles attempts to perform a time interval recovery operation, if the other vehicle cannot yet operate (due to failure or the like), the vehicle performing the recovery operation may eventually stop immediately before the vehicle that cannot operate.

Thus, it is difficult to adjust the vehicle spacing while performing the recovery operation among the plurality of delayed vehicles, but a solution to this has not been described in PTL 1.

Further, with a train spacing control method based on a delay time described in PTL 1, it is not possible to cope with an unexpected event, such as a case in which a vehicle is suddenly withdrawn to a vehicle depot or a case in which a failure vehicle is on a line, rather than a case in which departure of a vehicle is delayed.

Further, when the vehicle performs an operation that is not based on a timetable, information indicating an arrival platform, an arrival vehicle, and an arrival time is not displayed on the display screen of the station.

The present invention provides an operation management device, an operation management method, a vehicle, a vehicular traffic system, and a program capable of solving the above-described problems.

Solution to Problem

According to a first aspect of the invention, there is provided an operation management device that manages an operation of a plurality of vehicles traveling along a track, the operation management device including: a vehicle position acquisition unit that acquires positions of the plurality of vehicles present on the track; a density calculation unit that calculates density of the plurality of vehicles traveling within a predetermined range on the track; and a departure determination unit that adjusts a departure time of a predetermined target vehicle by changing a time to transmit a departure instruction to the target vehicle on the basis of one or both of front direction density indicating density of vehicles traveling within a predetermined range in front in a travel direction of the target vehicle, and rear direction density indicating density of vehicles traveling within a predetermined range at the rear in the travel direction of the target vehicle.

According to a second aspect of the invention, in the operation management device described above, the departure determination unit adjusts the departure time at a stop station of the target vehicle on the basis of a magnitude relationship between the front direction density and a predetermined front direction density threshold value.

According to a fourth aspect of the invention, in the operation management device described above, the departure determination unit adjusts the departure time at a stop station of the target vehicle on the basis of a magnitude relationship between the rear direction density and a predetermined rear direction density threshold value.

According to a fourth aspect of the invention, in the operation management device described above, the departure determination unit delays the departure time at the stop station of the target vehicle when a front and rear direction density difference that is a value obtained by subtracting the rear direction density from the front direction density is greater than a predetermined density difference threshold value.

According to a fifth aspect of the invention, in the operation management device described above, the departure determination unit further adjusts the departure time at the stop station of the target vehicle on the basis of one or both of an inter-vehicle distance between the target vehicle and another vehicle traveling in a nearest position in front in a travel direction of the target vehicle and an inter-vehicle distance between the target vehicle and another vehicle traveling in a nearest position at the rear in the travel direction.

According to a sixth aspect of the invention, in the operation management device described above, the vehicle position acquisition unit further acquires a travel direction of the plurality of vehicles, and the density calculation unit performs a correction to increase the front direction density when it is determined that there is a vehicle traveling in a direction opposite to the travel direction of the target vehicle, in front in the travel direction on the track along which the target vehicle travels.

According to a seventh aspect of the invention, in the operation management device described above, the departure determination unit further adjusts the departure time not to be a time earlier than an earliest departure time determined for each vehicle and each station by referring to operation timetable information in which the earliest departure time has been recorded.

According to an eighth aspect of the invention, in the operation management device described above, the departure determination unit further obtains permission of progress for a security device that performs control of the operation while securing safety for a path along which the target vehicle should progress, the path being specified on the basis of path information of the track, before transmitting the departure instruction to the target vehicle.

According to a ninth aspect of the invention, there is provided a vehicular traffic system including: the operation management device described above; and a passenger information system that receives identification information, position information, and path information of the target vehicle from the operation management device, calculates a scheduled arrival time for each station of the target vehicle, and displays the calculated scheduled arrival time on a display screen installed in each station.

According to a tenth aspect of the invention, there is provided a vehicle that travels along a track, including: a vehicle position acquisition unit that acquires positions of a plurality of vehicles including an own vehicle present on the track; a density calculation unit that calculates density of the plurality of vehicles traveling within a predetermined range on the track; and a departure determination unit that adjusts a departure time at a stop station of the own vehicle on the basis of one or both of front direction density indicating density of other vehicles traveling within a predetermined range in front in a travel direction of the own vehicle, and rear direction density indicating density of other vehicles traveling within a predetermined range at the rear in the travel direction of the own vehicle.

According to an eleventh aspect of the invention, there is provided an operation management method for managing an operation of a plurality of vehicles traveling along a track, the operation management method including the steps of: acquiring positions of the plurality of vehicles present on the track; calculating front direction density indicating density of vehicles traveling within a predetermined range in front in a travel direction of a predetermined target vehicle, and rear direction density indicating density of vehicles traveling within a predetermined range at the rear in the travel direction of the target vehicle; and adjusting a departure time at a stop station of the target vehicle on the basis of one or both of the front direction density and the rear direction density.

According to a thirteenth aspect of the invention, there is provided a program that causes a computer of an operation management device that manages an operation of a plurality of vehicles traveling along a track to function as: vehicle position acquisition means for acquiring positions of the plurality of vehicles present on the track; density calculation means for calculating density of the plurality of vehicles traveling within a predetermined range on the track; and time adjustment means for adjusting a departure time at a stop station of a predetermined target vehicle on the basis of one or both of front direction density indicating density of vehicles traveling within a predetermined range in front in a travel direction of the target vehicle, and rear direction density indicating density of vehicles traveling within a predetermined range at the rear in the travel direction of the target vehicle.

Advantageous Effects of Invention

According to the operation management device, the operation management method, the vehicle, the vehicular traffic system, and the program, when the provision of the transportation service using vehicles becomes nonuniform, an effect of resolving this can be obtained more rapidly. Further, even when an unexpected event, such as a case in which a certain vehicle is suddenly withdrawn to the vehicle depot or a case in which there is a failure vehicle on the line, occurs, it is possible to continue the operation without performing adjustment of the timetable.

BRIEF DESCRIPTION OF DRAWINGS

FIG. 8 is a diagram illustrating a functional configuration of a vehicular traffic system according to a third embodiment of the present invention.

FIG. 11 is a diagram illustrating a functional configuration of a vehicular traffic system according to a fourth embodiment of the present invention.

DESCRIPTION OF EMBODIMENTS

First Embodiment

Hereinafter, a vehicular traffic system according to a first embodiment of the present invention will be described with reference to the drawings.

Figure 1:
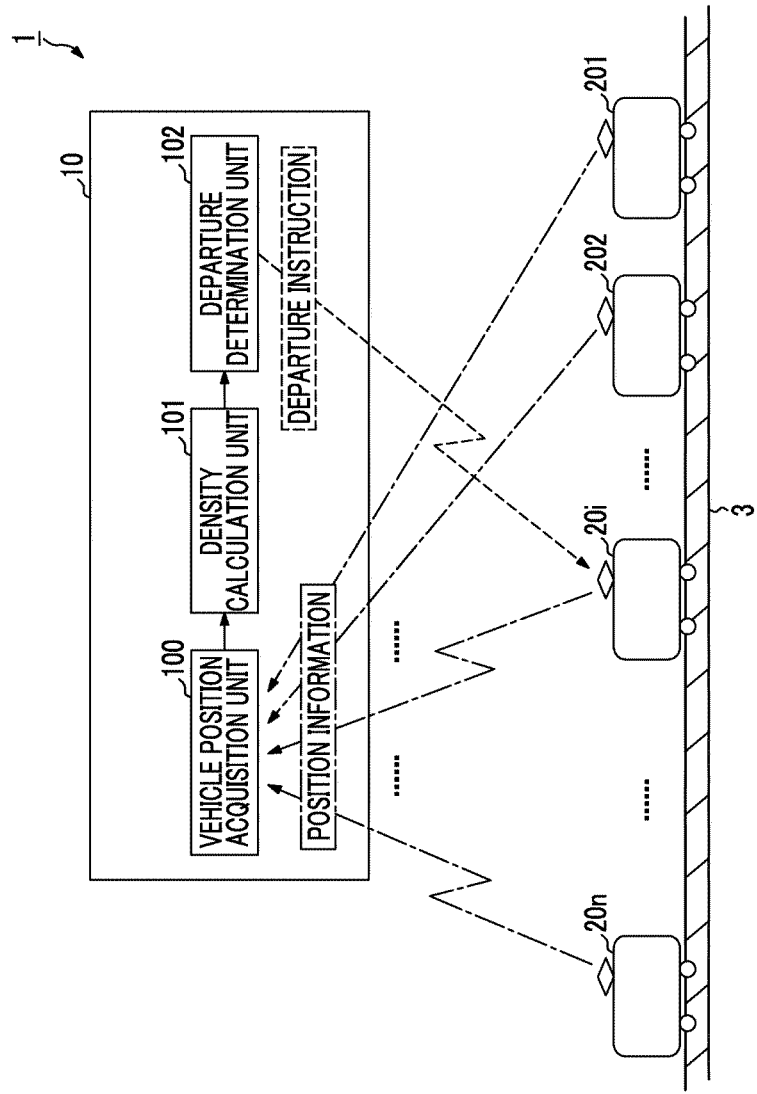
FIG. 1 is a diagram illustrating a functional configuration of a vehicular traffic system according to a first embodiment of the present invention.

FIG. 1 is a diagram illustrating a functional configuration of a vehicular traffic system according to a first embodiment of the present invention. In FIG. 1, reference sign 1 indicates a vehicular traffic system.

(Configuration of Entire Vehicular Traffic System)

First, an entire configuration of the vehicular traffic system 1 will be described.

As illustrated in FIG. 1, a vehicular traffic system according to the present embodiment includes an operation management device 10, and a plurality of vehicles 201, 202, . . . , and 20n (n is an integer equal to or greater than 2) that travel along a track 3. The operation management device 10 is called a ground facility, and is a device for controlling an operation of the plurality of vehicles 201, 202, . . . , and 20n.

The operation management device 10 according to the present embodiment is a functional unit that transmits a departure instruction to each of the vehicles 201, 202, . . . , and 20n on the basis of a determination of the departure determination unit 102 to be described below. The operation management device 10 transmits the departure instruction to each of the vehicles 201 to 20n using wireless communication means or the like. Each of the vehicles 201 to 20n operates on the basis of the departure instruction received from the operation management device 10.

In an actual operation of the vehicle, operation control based on a security device (interlocking device) or a signal is further added. However, a case in which the operation control of the vehicles 201 to 20n is simply performed on the basis of the operation management device 10 will be described for simplification of the description of the present embodiment (a case in which the security device or the like is used will be described below with reference to FIG. 19.)

The vehicles 201, 202, . . . , and 20n constitute a train that travels along the track 3 (line). The vehicles 201 to 20n travel while arriving at and departing from a plurality of stations (not illustrated in FIG. 1) provided along the track 3 according to an operation instruction received from the operation management device 10. Further, predetermined position detection devices (not illustrated) are provided at regular intervals in the track 3, and each of the vehicles 201 to 20n communicates with the position detection device, and thus, can recognize a position on the track 3 in which the own vehicle travels.

This function will be described in greater detail. Each of the vehicles 201 to 20n includes its own line database. Also, each of the vehicles 201 to 20n has a function of measuring the number of tire rotations of the own vehicle to calculate a travel distance and recognizing a current position of the own vehicle. However, in this case, the current position recognized from the number of tire rotations may deviate from an actual position due to tire slip. Each of the vehicles 201 to 20n corrects the deviation through a comparison with a position detection device placed on the ground, and accurately recognizes a position on the track 3 in which the own vehicle is traveling.

Here, in a high density line section as arranged in an inner city portion (a line in which the number of operations of the vehicle is relatively large), it may be important for the vehicle to arrive and depart at regular time intervals, rather than coming and going according to a timetable. That is, a passenger does not use a transportation service with recognition of a definite arrival and departure time, and there are a number of passengers using the transportation service with recognition of an approximate travel time to a destination station on the basis of a time interval of coming and going of the vehicle. In this case, the passenger lays weight on the vehicle coming and going at desired time intervals, rather than the vehicle departing and arriving on time. Here, in operation control to perform timetables change work to eliminate disturbance of the operation, the timetable changing work consumes time. Accordingly, as a result, it takes excessive time to eliminate the disturbance of the operation. It is believed that an appropriate transportation service can be provided to passengers by rapidly uniformizing the time intervals among the respective vehicles regardless of the timetable. Accordingly, the vehicular traffic system 1 according to the present embodiment has a function of more rapidly uniformizing the time intervals among the respective vehicles on the basis of the operation of the operation management device 10 to be described below when a delay occurs in a specific vehicle and provision of the transportation service is nonuniform.

(Configuration of Operation Management Device)

Next, a configuration of the operation management device 10 will be described.

As illustrated in FIG. 1, the operation management device 10 according to the present embodiment includes a vehicle position acquisition unit 100, a density calculation unit 101, and a departure determination unit 102.

The vehicle position acquisition unit 100 is a functional unit that acquires positions of the plurality of vehicles 201 to 20n present on the track 3. Each of the vehicles 201 to 20n can communicate with a position detection device (not illustrated) provided on the track 3 to recognize a position on the track 3 in which the own vehicle is traveling, as described above. Also, the respective vehicles 201 to 20n sequentially transmit "position information" indicating the positions of the own vehicles to the operation management device 10 through wireless communication. The vehicle position acquisition unit 100 of the operation management device 10 receives the position information of the respective vehicles 201 to 20n to acquire the positions of the vehicles 201 to 20n. Further, in another embodiment, each of the vehicles 201 to 20n may transmit the position information to the operation management device 10 through priority communication.

The density calculation unit 101 is a functional unit that calculates density of the plurality of vehicles 201 to 20n that travel within a predetermined range on the track 3. Specifically, the density calculation unit 101 acquires the number of vehicles traveling within the predetermined range on the basis of the positions of the respective vehicles 201 to 20n acquired by the vehicle position acquisition unit 100. The density calculation unit 101 stores the number of vehicles as the "density" of the vehicles traveling within the predetermined range. A specific function of the density calculation unit 101 will be described below.

The departure determination unit 102 is a functional unit that adjusts a departure time at a stop station of a predetermined target vehicle 20i (i is an integer satisfying 1≤i≤n, the same applies below) on the basis of one or both of a "front direction density Df" and a "rear direction density Dr" of the target vehicle 20i. Here, "to adjust a departure time" is specifically to adjust a departure time by changing a time to transmit a departure instruction to the target vehicle 20i.

Here, the front direction density Df is density of the vehicles traveling in the predetermined range at the front in the travel direction of the target vehicle 20i. Further, the rear direction density Dr is density of vehicles traveling within a predetermined range at the rear in the travel direction of the target vehicle 20i. Specifically, the departure determination unit 102 performs a process of suspending transmission of the departure instruction of the target vehicle 20i until predetermined condition is satisfied on the basis of one or both of the "front direction density Df" and the "rear direction density Dr". Also, the departure determination unit 102 performs a process of transmitting the departure instruction at a timing at which the predetermined condition has been satisfied. The target vehicle 20i departs from the stop station at a timing at which the departure instruction has been received (more precisely, requirements for another departure have been satisfied).

Also, in another embodiment, instead of the above aspect, the departure determination unit 102 may perform a process of continuing to transmit a predetermined "departure suspending instruction" while the predetermined condition has been not satisfied, and stopping the transmission of the departure suspending instruction (releasing the departure suspending instruction) at a timing at which the predetermined condition has been satisfied. In this case, the target vehicle 20i does not depart while continuing to receive the departure suspending instruction, and departs from the stop station at a timing at which the departure suspending instruction has been released.

Specific content of predetermined condition on the basis of one or both of "front direction density Df" and "rear direction density Dr" will be described below.

(Functions of Density Calculation Unit and Departure Determination Unit)

Figure 2:
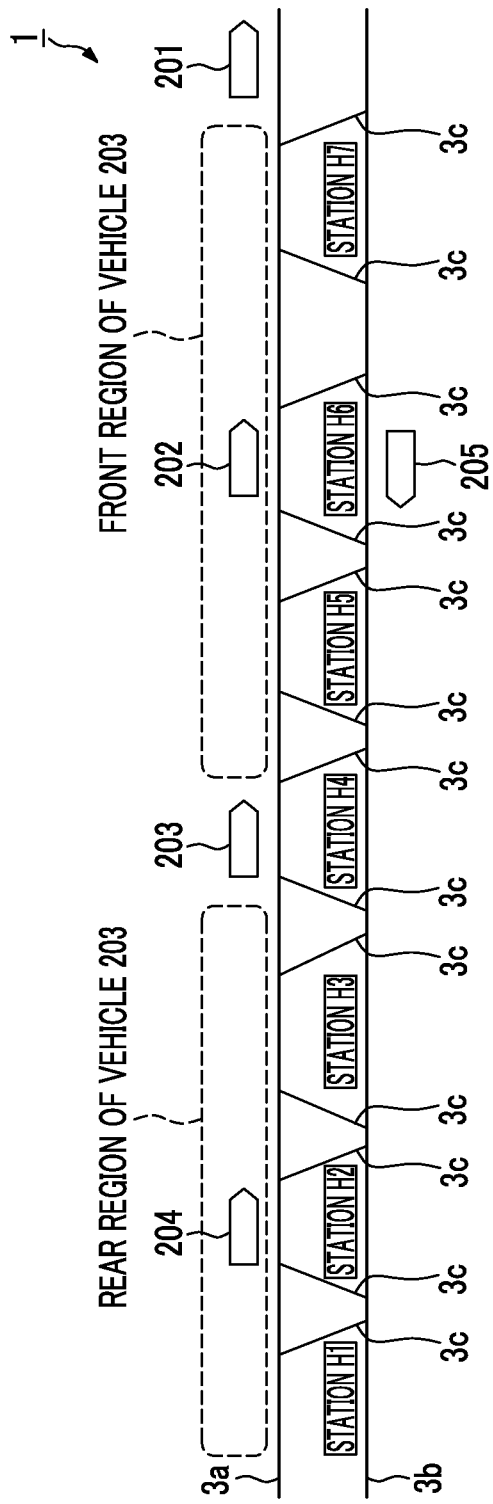
FIG. 2 is a diagram illustrating functions of a density calculation unit and a departure determination unit according to the first embodiment of the present invention.

FIG. 2 is a diagram illustrating functions of the density calculation unit and the departure determination unit according to the first embodiment of the present invention. Further, vehicles 201 to 204 illustrated in FIG. 2 are vehicles that travel along a first track 3a from the left of a paper surface to the right. On the other hand, a vehicle 205 is a vehicle that travels along a second track 3b different from the first track 3a from the right of the paper surface to the left. The respective vehicles 201 to 205 travel in the respective travel directions while arriving at and departing from each station illustrated in FIG. 2. Further, a plurality of branches 3c are provided between the first track 3a and the second track 3b, and each of the vehicles 201 to 205 may follow a path to and from the first track 3a and the second track 3b via the branch 3c.

Hereinafter, the function of the density calculation unit 101 will be described with reference to FIG. 2.

The density calculation unit 101 calculates the "front direction density Df" and the "rear direction density Dr" for each of the vehicles 201 to 20n on the basis of the position information of each of the vehicles 201 to 20n acquired by the vehicle position acquisition unit 100. Specifically, the density calculation unit 101 according to the present embodiment acquires the number of the vehicles 201 to 20n which travel within the range from the nearest position in front in the travel direction of the specific target vehicle 20i to kf stations in front in the travel direction (kf is an integer equal to or greater than 1), and calculates the front direction density Df of the target vehicle 20i to be "Df=number of vehicles/kf". Similarly, the density calculation unit 101 acquires the number of the vehicles 201 to 20n which travel within the range from the nearest position at the rear in the travel direction of the target vehicle 20i to kr stations at the rear in the travel direction (kr is an integer equal to or greater than 1), and calculates the rear direction density Dr of the target vehicle 20i to be "Dr=number of vehicles/kr". Further, in the following description, a range from the nearest position in front in the travel direction of the target vehicle 20i to front kf stations in the travel direction is referred to as a "vehicle 20i front region". Further, a range from the nearest position at the rear in the travel direction of the target vehicle 20i to rear kr stations in the travel direction is referred to as a "vehicle 20i rear region".

FIG. 2 illustrates, for example, a case in which the target vehicle 20i is the vehicle 203, and the density calculation unit 101 obtains the front direction density Df and the rear direction density Dr of the vehicle 203 within the range of three stations (kf=3) in front in the travel direction of the vehicle 203 and three stations (kr=3) at the rear thereof. The vehicle 203 stops at a station H4, as illustrated in FIG. 2. In this case, a front region of the vehicle 203 is a range determined to be a section from a nearest position in front in the travel direction of the own vehicle to a station H7 (FIG. 2). On the other hand, a rear region of the vehicle 203 is a range determined to be a section from a nearest position at the rear in the travel direction of the own vehicle to the station H3 (FIG. 2). Further, the front region of the vehicle 203 and the rear region of the vehicle 203 move to follow the travel of the vehicle 203. For example, if the vehicle 203 has moved from the station H4 to the station H5, the front region of the vehicle 203 includes three stations (stations H6 to H8 (the station H8 is not illustrated)) in front in the travel direction from the station H5, and the rear region of the vehicle 203 includes the three stations (stations H2 to H4) at the rear in the travel direction from the station H5.

According to the example illustrated in FIG. 2, another vehicle 202 is present in the front region (kf=3) of the vehicle 203. Accordingly, the density calculation unit 101 calculates the front direction density Df to be "1/3". Another vehicle 204 is present in the rear region (kr=3) of the vehicle 203. Accordingly, the density calculation unit 101 calculates the rear direction density Dr to be "1/3". Further, when the density calculation unit 101 calculates the front direction density Df, the density calculation unit 101 considers only the vehicles 201 to 20n that travel in advance along a path along which the vehicle 203 is scheduled to travel. Accordingly, in the example illustrated in FIG. 2, in the calculation of the front direction density Df of the vehicle 203, the vehicle 205 traveling a path (second track 3b) different from the path (first track 3a) along which the vehicle 203 is scheduled to travel is not considered. Further, in the calculation of the rear direction density Dr, the other vehicles 201 to 20n traveling along the path (second track 3b) different from the path (first track 3a) along which the vehicle 203 has traveled is not considered.

Next, a function of the departure determination unit 102 will be described.

The departure determination unit 102 adjusts a departure time at a stop station of the target vehicle 20i on the basis of the front direction density Df and the rear direction density Dr of the target vehicle 20i. Specifically, when a front and rear direction density difference $\Delta D$ that is a value obtained by subtracting the rear direction density Dr from the front direction density Df exceeds a predetermined density difference threshold value $\alpha$ ($\alpha$ is a value greater than or equal to 0) ($\Delta D > \alpha$), the departure determination unit 102 suspends transmission of the departure instruction to the target vehicle 20i until a condition that the front and rear direction density difference $\Delta D$ is equal to or less than the density difference threshold value $\alpha$ ($\Delta D \leq \alpha$) is satisfied, to delay the departure time of the target vehicle 20i.

Here, the density difference threshold value $\alpha$ is assumed to have been set to "0". In this case, according to the example illustrated in FIG. 2, the departure determination unit 102 calculates the front and rear direction density difference $\Delta D$ to be "$\Delta D = 0$ (=Df−Dr)" from the front direction density Df=1/3 and the rear direction density Dr=1/3 for the vehicle 203 that is the target vehicle 20i. Then, the vehicle 203 satisfies $\Delta D \leq \alpha$ (=0), and thus, the departure determination unit 102 transmits the departure instruction to the vehicle 203 at a predetermined timing of departure. The vehicle 203 receives the departure instruction and departs from the stop station H4.

Here, in the above description, in the departure determination unit 102, a condition that the transmission of the departure instruction to the target vehicle 20i is suspended are $\Delta D > \alpha$, and a condition that the departure instruction is transmitted to the target vehicle 20i are also $\Delta D \leq \alpha$. However, in the departure determination unit 102 according to another embodiment, the condition that the transmission of the departure instruction to the target vehicle 20i is suspended may be $\Delta D > \alpha$, and the condition that the departure instruction is transmitted to the target vehicle 20i may be $\Delta D \leq \beta$ ($< \alpha$) using $\beta$ different from $\alpha$.

By doing so, a period in which the departure instruction is suspended is set to be longer, and thus, it is possible to reduce a frequency at which adjustment is performed.

(Process Flow of Operation Management Device According to First Embodiment)

Figure 3:
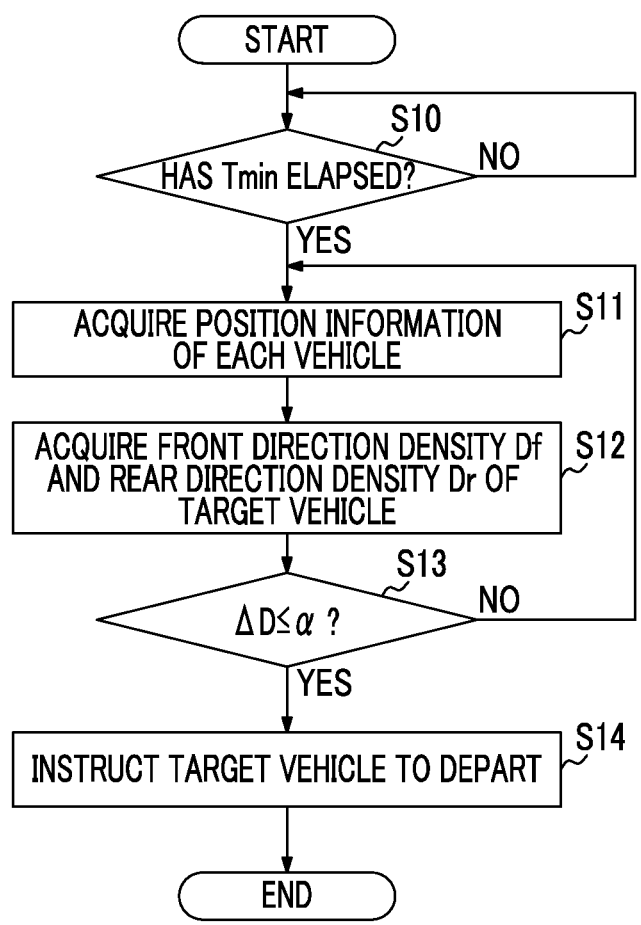
FIG. 3 is a flowchart illustrating a process flow of an operation management device according to the first embodiment of the present invention.

FIG. 3 is a flowchart illustrating a process flow of the operation management device according to the first embodiment of the present invention.

The operation management device 10 according to the present embodiment executes the process flow to be described below (FIG. 3) using the vehicle position acquisition unit 100, the density calculation unit 101, and the departure determination unit 102 described above. Further, the process flow in FIG. 3 is a process flow until the departure instruction is transmitted to the target vehicle 20i which has stopped at a predetermined station.

In the operation management device 10 according to the present embodiment, a minimum stop time Tmin which is a period of time in which each of the vehicles 201 to 20n should at least stop at the stop station in order to ensure a time taken for a passenger to get on or off is defined in advance. The departure determination unit 102 of the operation management device 10 first determines whether the minimum stop time Tmin has elapsed after receiving a notification indicating that the target vehicle 20i arrives at the stop station (step S10). Here, when the minimum stop time Tmin has not elapsed ("NO" in step S10), the process does not proceed to the next step until the minimum stop time Tmin elapses.

If the minimum stop time Tmin has elapsed ("YES" in step S10), the vehicle position acquisition unit 100 of the operation management device 10 first acquires the position information of the respective vehicles 201 to 20n traveling along the track 3 from the vehicles 201 to 20n (step S11). Further, as described above, each of the vehicles 201 to 20n can appropriately acquire, for example, the number of tire rotations of the own vehicle, or position information indicating an exact position of the own vehicle by communicating with position detection devices (not illustrated) provided at regular intervals in the track 3. Here, the position information is, for example, information represented in km on the track 3. Specifically, each of the vehicles 201 to 20n acquires a position (km) in which the position detection device has been installed on the tracks 3 through the communication with the position detection device, and uniquely defines the position (km) of the own vehicle on the basis of an elapsed time from a timing of the communication, a travel speed, or the like.

Further, means with which the vehicle position acquisition unit 100 acquires the position information of each of the vehicles 201 to 20n is not limited to the above-described embodiment. For example, the position of each of the vehicles 201 to 20n may be acquired from predetermined coordinate information received by the respective vehicles 201 to 20n from a satellite on the basis of a GPS (Global Positioning System).

Then, the density calculation unit 101 calculates the front direction density Df and the rear direction density Dr for the target vehicle 20i on the basis of the position information of each of the vehicles 201 to 20n acquired in step S11 (step S12). Also, the departure determination unit 102 calculates the front and rear direction density difference ΔD on the basis of the front direction density Df and the rear direction density Dr calculated in step S12, and determines whether the front and rear direction density difference ΔD is equal to or less than the density difference threshold value α (step S13). Here, when the condition that the front and rear direction density difference ΔD is equal to or less than the density difference threshold value α is not satisfied ("NO" in step S13), the departure determination unit 102 proceeds to step S11 and performs the process of acquiring the position information and calculating the front direction density Df and the rear direction density Dr again. On the other hand, when the condition that the front and rear direction density difference ΔD is equal to or less than the density difference threshold value α is satisfied ("YES" in step S13), the departure determination unit 102 immediately transmits the departure instruction to the target vehicle 20i (step S14).

The operation management device 10 executes the above-described process flow to realize a process of suspending departure of the target vehicle 20i when the front and rear direction density difference ΔD is greater than the density difference threshold value α and transmitting the departure instruction to the target vehicle 20i at a time at which the front and rear direction density difference ΔD is less than the density difference threshold value α.

Further, in the example of the above-described flowchart, the departure determination unit 102 of the operation management device 10 first determines whether the minimum stop time Tmin has elapsed to detect that the minimum stop time Tmin has elapsed in step S10, and then, performs the departure determination based on the determination of the front direction density Df, the rear direction density Dr, and the front and rear direction density difference ΔD (steps S11 to S13). However, other embodiments are not limited to such a processing order. For example, the operation management device 10 may perform the determination as to whether the minimum stop time Tmin has elapsed (step S10) after the determination of the front and rear direction density difference ΔD has been performed or may perform the determination simultaneously with and in parallel to the determination of the front and rear direction density difference ΔD. More specifically, for example, the operation management device 10 first performs the process in steps S11, S12, and S13, and repeats the process when the determination of the front and rear direction density difference ΔD is NO in step S13. Also, the operation management device 10 may then perform the determination as to whether the minimum stop time Tmin has elapsed (step S10) when the determination is YES in step S13, and may perform a process of executing steps S11, S12, and S13 again when the determination is NO.

By doing so, the process of comparing the front direction density with the rear direction density (steps S11 to S13) is performed without waiting for the minimum stop time Tmin, and thus, it is possible to include a time required for the process itself in the waiting time of Tmin, and to eliminate a delay of departure instruction transmission.

(Effects of Operation Management Device According to First Embodiment)

Figure 4A:
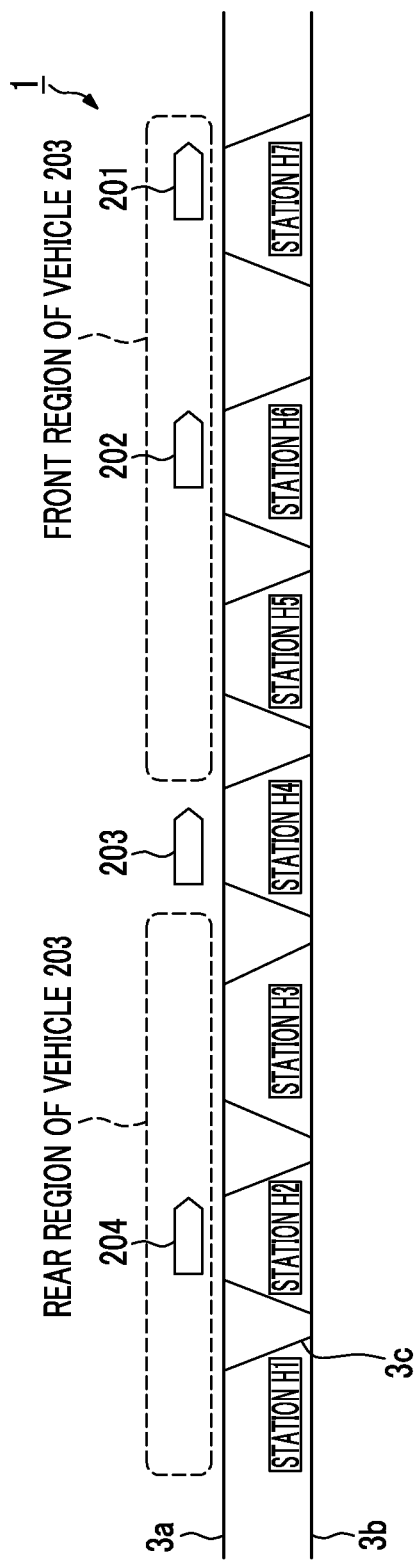
FIG. 4A is a first diagram illustrating effects of a vehicular traffic system according to the first embodiment of the present invention.
Figure 4B:
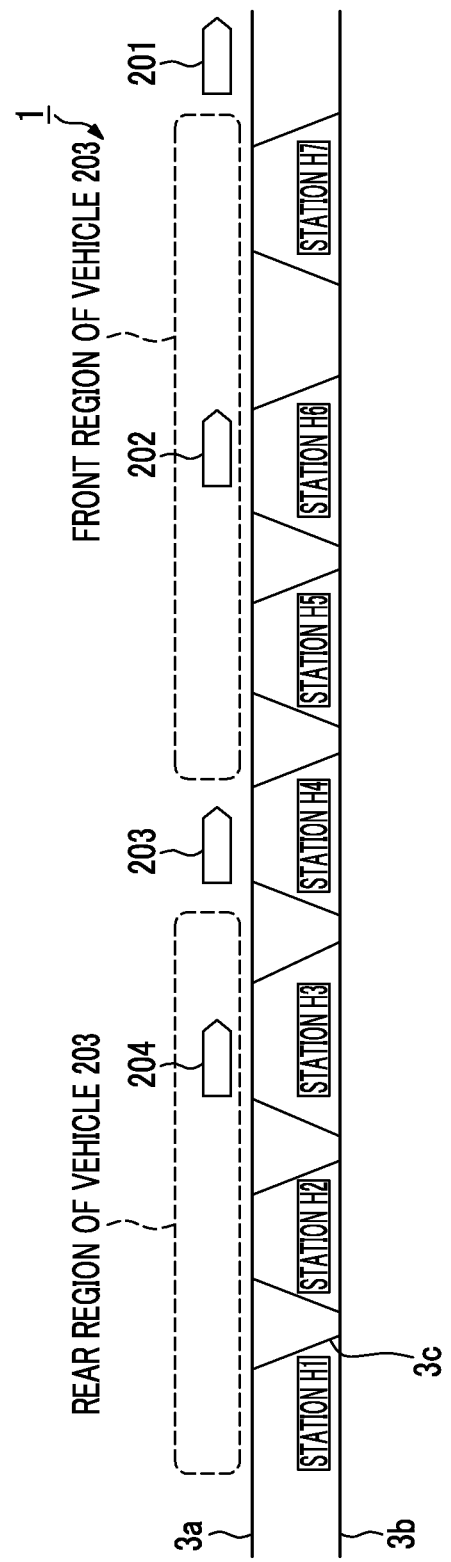
FIG. 4B is a second diagram illustrating effects of the vehicular traffic system according to the first embodiment of the present invention.
Figure 5A:
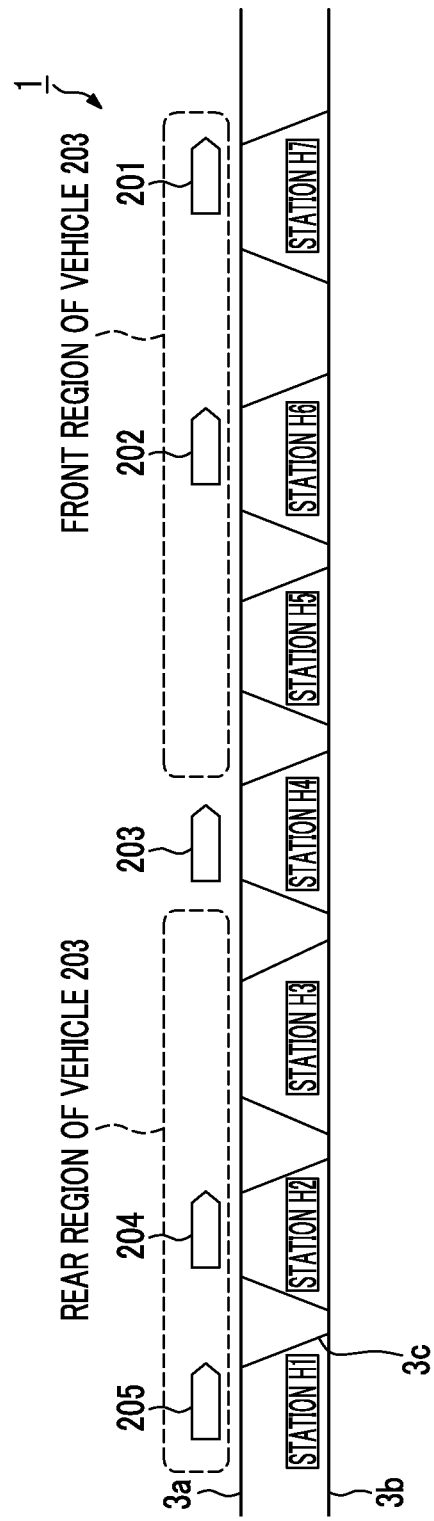
FIG. 5A is a third diagram illustrating effects of the vehicular traffic system according to the first embodiment of the present invention.
Figure 5B:
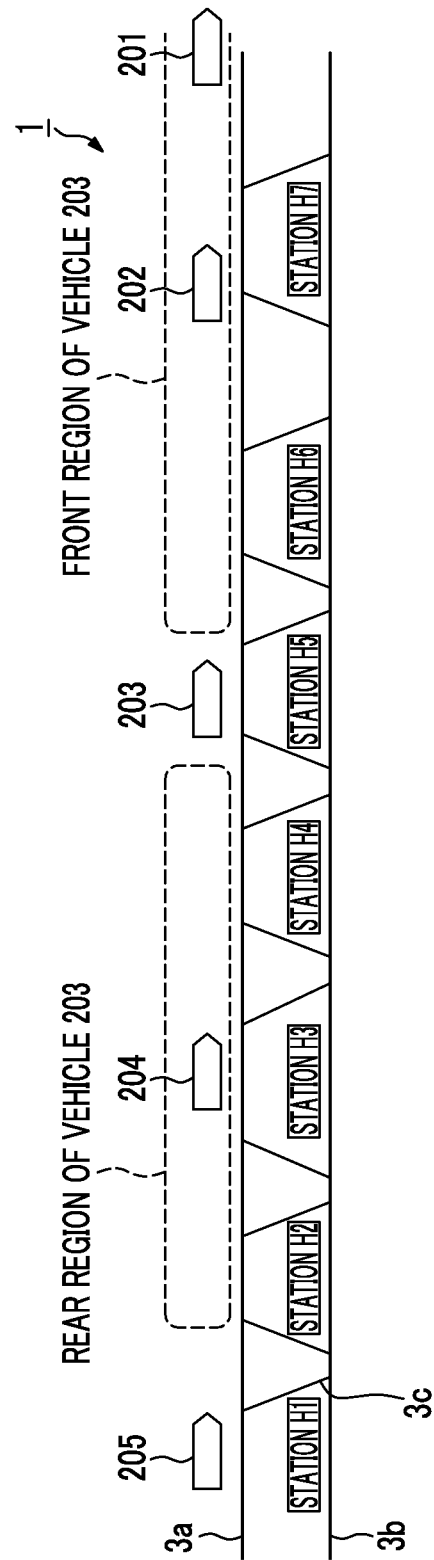
FIG. 5B is a fourth diagram illustrating effects of the vehicular traffic system according to the first embodiment of the present invention.

FIGS. 4A and 4B are first and second diagrams illustrating effects of the vehicular traffic system according to the first embodiment of the present invention. The respective vehicles 201 to 204 illustrated in FIGS. 4A and 4B are vehicles that travel along a first track 3a from the left of a paper surface to the right. FIGS. 5A and 5B are third and fourth diagrams illustrating effects of the vehicular traffic system according to the first embodiment of the present invention. The respective vehicles 201 to 205 illustrated in FIGS. 5A and 5B are vehicles that travel along the first track 3a from the left of a paper surface to the right, as in FIGS. 4A and 4B.

The operation management device 10 of the vehicular traffic system 1 according to the present embodiment performs operation management so that the vehicles 201 to 20n operate at equal intervals on the basis of the processes of the respective functional units of the vehicle position acquisition unit 100, the density calculation unit 101, and the departure determination unit 102 described above. Here, specific effects of the operation management of the operation management device 10 according to the present embodiment will be described with reference to FIGS. 4A and 4B and FIGS. 5A and 5B. Further, in an example described with reference to FIGS. 4A and 4B and FIGS. 5A and 5B, the example is focused on the operation of the vehicle 203 as the target vehicle 20i, and it is assumed that kf=kr=3 and α=0, as in the example illustrated in FIG. 2.

First, effects of the operation management performed in consideration of the front direction density Df will be described with reference to FIGS. 4A and 4B.

In FIG. 4A, a state in which a vehicle (not illustrated) that travels in front in the travel direction of the vehicle 201 traveling on the first track 3a suffers from any trouble and the departure time is delayed in the vehicular traffic system 1 is illustrated. As illustrated in FIG. 4A, vehicle spacing between the vehicle 201 and the vehicle 202 is shorter than a normal vehicle spacing under the influence of the delay of the departure time. Here, the description is focused on the vehicle 203 illustrated in FIG. 4A. The density calculation unit 101 detects that two vehicles including the vehicle 201 and the vehicle 202 are present in the front region of the vehicle 203 on the basis of the position information acquired through the vehicle position acquisition unit 100. Similarly, the density calculation unit 101 detects that one vehicle including the vehicle 204 is present in the rear region of the vehicle 203 on the basis of the acquired position information. Also, the density calculation unit 101 calculates the front direction density Df for the vehicle 203 to be "2/3" the rear direction density Dr to be "1/3".

Then, the departure determination unit 102 calculates the front and rear direction density difference $\Delta D$ (=Df−Dr) to be "$\Delta D$=+1/3" from the front direction density Df and the rear direction density Dr calculated by the density calculation unit 101. Thus, since the condition ($\Delta D \geq \alpha$) that the front and rear direction density difference $\Delta D$ (=+1/3) is equal to or less than the density difference threshold value $\alpha$ (=0) is not satisfied, the departure determination unit 102 suspends the transmission of the departure instruction to the vehicle 203. In the example illustrated in FIG. 4A, although there are no other vehicles 201 to 20$n$ stop at a station H5, the vehicle 203 intentionally waits at the stop station H4 without proceeding to the station H5.

Then, the vehicular traffic system 1 transitions from the state illustrated in FIG. 4A to a state illustrated in FIG. 4B. Here, FIG. 4B illustrates a state immediately after the vehicle 201 has departed from the station H7 in front in the travel direction of the vehicle 203. Then, the vehicle in the front region of the vehicle 203 is only one vehicle including the vehicle 202. Thus, the density calculation unit 101 calculates the front direction density Df of the vehicle 203 to be "1/3". Subsequently, the departure determination unit 102 calculates the front and rear direction density difference $\Delta D$ (=Df−Dr) to be "$\Delta D$=0". Thus, since the condition ($\Delta D \leq \alpha$) that the front and rear direction density difference $\Delta D$ (=0) is equal to or less than the density difference threshold value $\alpha$ (=0) is satisfied, the departure determination unit 102 immediately transmits the departure instruction to the vehicle 203 (at this point, the minimum stop time Tmin is assumed to have elapsed). The vehicle 203 receives the departure instruction from the departure determination unit 102 and departs from the stop station H4.

According to the vehicular traffic system 1 of the present embodiment, when the operation of the vehicles 201 to 20$n$ becomes nonuniform due to vehicle's trouble or the like (FIG. 4A), the operation management device 10 performs the operation management as described above, and thus, it is possible to rapidly uniformize the vehicle spacing. For example, in the case of a conventionally used operation management device, the vehicle 203 departs from the station H4 toward the station H5 according to a determined timetable even when the vehicle spacing in front of the vehicle 203 becomes short as illustrated in FIG. 4A. As a result, the vehicles 201 to 203 enter a more overcrowded state (overcrowding state), causing nonuniform provision of a transportation service. Further, once the vehicles enter such an overcrowded state, it takes time to return to normal vehicle spacing.

On the other hand, according to the vehicular traffic system 1 of the present embodiment, in the example illustrated in FIGS. 4A and 4B, the density calculation unit 101 detects a state of the density of the other vehicles 201 and 202 that are in the range of the front region of the vehicle 203. Also, if the vehicles are "dense" in the region, the departure determination unit 102 immediately suspends the departure of the vehicle 203 even though the next station is available, and thus it is possible to prevent a more overcrowded state (overcrowding state) in advance. Further, when a delay is generated in front of the vehicle 203, according to the conventional operation management device, the departure time of the vehicle 203 is adjusted on the basis of vehicle spacing with the nearest vehicle 202 in front of the vehicle 203, whereas according to the vehicular traffic system 1 of the present embodiment, the departure of the vehicle 203 is determined on the basis of departure of the vehicle 201 from the station H7, as in FIG. 4B. That is, when it is determined that the vehicles is out of the "dense" state in the front region of the vehicle 203, the departure determination unit 102 immediately transmits the departure instruction to the vehicle 203 regardless of the vehicle spacing between the vehicle 203 and the vehicle 202 traveling in a nearest position. This process implicitly involves prediction that if the vehicle spacing between the vehicle 203 and the vehicle 202 has been small, there is some room in the vehicle spacing between the vehicle 202 and the vehicle 201, and thus, the vehicle 202 will smoothly travel.

That is, when the vehicular traffic system 1 according to the present embodiment detects that the vehicles enter a "dense" state in the target vehicle 20$i$ front region, the vehicular traffic system 1 immediately delays the departure and prevents a more overcrowded state (overcrowding state) in advance. Further, when it is determined that the vehicle 20$i$ front region is out of the "dense" state, the target vehicle 20$i$ is caused to depart without waiting for the vehicle spacing between the target vehicle 20$i$ and the vehicles 201 to 20$n$ traveling in a nearest position in front in the travel direction of the target vehicle 20$i$ increases. Thus, the vehicular traffic system 1 according to the present embodiment determines, for the target vehicle 20$i$, the departure/stop of the target vehicle 20$i$ from a step before the vehicles 201 to 20$n$ enter the overcrowded state on the basis of the vehicle density in the vehicle 20$i$ front region, and thus, when provision of a transportation service becomes nonuniform, it is possible to shorten the time to solve this.

Next, the effects of the operation management performed in consideration of the rear direction density Dr will be described with reference to FIGS. 5A and 5B.

FIG. 5A illustrates a state in which two vehicles including the vehicles 201 and 202 travel in the front region of the vehicle 203 and two vehicles including the vehicles 204 and 205 travel in the rear region of the vehicle 203 in the vehicular traffic system 1. Here, the front direction density Df and the rear direction density Dr of the vehicle 203 are "Df=2/3" and "Dr=2/3", respectively, and the vehicle 203 satisfies the departure condition $\Delta D \leq \alpha$(=0). Thus, the departure determination unit 102 transmits the departure instruction to the vehicle 203 after the minimum stop time Tmin has elapsed.

Here, a delay of the departure time is assumed to occur in the vehicle 205 (which stops at the station H1) located in the rear of the vehicle 203. Then, the vehicles other than the vehicle 205 travel, and accordingly, the respective vehicles 201 to 205 enter the state illustrated in FIG. 5B. As illustrated in FIG. 5B, as a result of the delay, the vehicle 205 is out of the rear region of the vehicle 203 and only the vehicle 204 is included, and thus, the rear direction density Dr of the vehicle 203 becomes "Dr=1/3". Then, the front direction density Df and the rear direction density Dr are "Df=2/3" and "Dr=1/3", respectively, and the vehicle 203 does not satisfy the departure condition $\Delta D \leq \alpha$(=0). Thus, the departure determination unit 102 suspends the transmission of the departure instruction to the vehicle 203 in the stop station H5.

Thus, in the example illustrated in FIGS. 5A and 5B, the vehicle 203 detects a state of the density of the other vehicles 204 and 205 that are within the range of the rear region of the vehicle 203, and immediately suspends the departure when the region is "uncrowded", thereby preventing a further uncrowded state (uncrowded state) in advance. Further, when the delay is generated in the rear of the vehicle 203, the departure time of the vehicle 203 is adjusted on the basis of the vehicle spacing between the vehicle 203 and the rear nearest vehicle 204 according to the conventional operation management device, whereas according to the vehicular traffic system 1 of the present embodiment, when the vehicle 205 arrives at the station H2 after the state of FIG. 5B, the departure of the vehicle 203 is determined regardless of the vehicle spacing between the vehicle 203 and the vehicle 204.

Thus, the vehicular traffic system 1 according to the present embodiment determines departure/stop of the target vehicle 20$i$ from a step before each of the vehicles 201 to 20$n$ enters a uncrowded state on the basis of the vehicle density in the vehicle 20$i$ rear region for the target vehicle 20$i$, and thus, when the provision of the transportation service becomes nonuniform, it is possible to advance a time until the nonuniform provision is resolved.

Further, a case in which the preceding vehicle 201 has been out of the front region of the vehicle 203 before the vehicle 205 belongs to the vehicle 203 rear region due to the stop of the vehicle 203 in the example illustrated in FIG. 5B will be described. In this case, the front direction density Df and the rear direction density Dr for the vehicle 203 are "Df=1/3" (only one vehicle 202) and "Dr=1/3" (only one vehicle 204), respectively. Accordingly, in this case, since condition that the front and rear direction density difference ΔD is equal to or less than the density difference threshold value α (ΔD≤α) is satisfied, the departure determination unit 102 immediately transmits the departure instruction to the vehicle 203 (at this time, the minimum stop time Tmin is assumed to elapse).

Here, in FIG. 5B, the departure determination unit 102 suspends departure of the vehicle 203 in order to prevent the rear region of the vehicle 203 from entering an uncrowded state (uncrowding state), and as a result, this time, the front region of the vehicle 203 may enter uncrowded state. Accordingly, the departure determination unit 102 transmits a departure instruction to the vehicle 203 even when the preceding vehicle 201 is out of the front region of the vehicle 203 before the vehicle 205 belongs to the vehicle 203 rear region as described above, such that the front direction density Df and the rear direction density Dr become uniform as much as possible. Thus, the departure determination unit 102 determines a transmission timing of the departure instruction on the basis of information of both of the front direction density Df and the rear direction density Dr, and thus, it is possible to more effectively suppress nonuniform provision of the transportation service.

As described above, according to the vehicular traffic system 1 of the first embodiment of the present invention, when the provision of the transportation service using vehicles becomes nonuniform, the adjustment of the departure time of each of the vehicles 201 to 20$n$ is performed from a step before the vehicles enter the overcrowded state or the uncrowded state, and thus, it is possible to resolve such a state more rapidly.

Further, according to the vehicular traffic system 1, the departure time is adjusted so as to prevent each vehicle from entering the overcrowded state and the uncrowded state, and thus, for example, even when it is difficult for some vehicles to operate due to their failure, other vehicles can wait for while maintaining the vehicle spacing not to enter the overcrowded state and the uncrowded state according to the stop of the failure vehicles.

Further, the examples (FIGS. 4A, 4B, 5A, and 5B) used in the above description are examples simplified for convenience of description, and application of the vehicular traffic system 1 according to the present embodiment is not limited to such examples. For example, while the density calculation unit 101 calculates the front direction density Df and the rear direction density Dr in a range corresponding to three stations in front of the target vehicle 20$i$ and three stations at the rear thereof (kf=kr=3) in the above description, a wider range, for example, ten stations in front of the target vehicle and ten stations at the rear thereof (kf=kr=10), may be set in the case of a route including tens of stations. Further, the values of kf and kr may be different.

Further, while the density calculation unit 101 according to the present embodiment has calculated the front direction density Df and the rear direction density Dr using the number of vehicles present within the range corresponding to the front kf stations and the rear kr stations in the travel direction in the position in which the target vehicle 20$i$ is present, the density calculation unit 101 according to another embodiment of the present invention is not limited to such an aspect. The density calculation unit 101 according to another embodiment may calculate the front direction density Df and the rear direction density Dr, for example, using the number of vehicles present within a predetermined line distance in the track 3 (for example, 10 km in front of the target vehicle 20$i$ and 10 km at the rear thereof).

Similarly, the density calculation unit 101 may calculate the front direction density Df and the rear direction density Dr using the number of vehicles present within a predetermined line section divided at regular intervals in the track 3 (for example, 10 sections in front of the target vehicle 20$i$ and 10 sections at the rear thereof). Thus, even when the spacing between stations installed in the track 3 is greatly nonuniform, the adjustment of the departure time can be appropriately performed on the basis of the density of the vehicles in an actual line distance or line section.

Further, the density calculation unit 101, for example, may calculate an inter-vehicle distance L from a third vehicle through counting from the nearest position in front (at the rear) in the travel direction of the target vehicle 20$i$, and calculate the front direction density Df (the rear direction density Dr) for the target vehicle 20$i$ on the basis of the inter-vehicle distance L. In this case, the density calculation unit 101 may calculate, for example, the front direction density Df (the rear direction density Dr) to be "Df(Dr)=3/L".

Further, the density calculation unit 101 may obtain an inter-vehicle distance L1 from a first vehicle through counting from the nearest position in front (at the rear) in the travel direction of the target vehicle 20$i$, an inter-vehicle distance L2 from a second vehicle, and an inter-vehicle distance L3 from a third vehicle, and calculate the front direction density Df (the rear direction density Dr) to be Df(Dr)=1/L1+1/L2+1/L3. BY doing so, density comparison can be performed in consideration of the distance of each vehicle located in front and rear of the target vehicle 20$i$, and a timing of departure can be controlled in greater detail.

Further, the process of the departure determination unit 102 of the vehicular traffic system 1 according to another embodiment of the present invention is not limited to the aspect in which the departure time is adjusted on the basis of both of the front direction density Df and the rear direction density Dr. That is, while the departure determination unit 102 according to the first embodiment has adjusted the departure time at the stop station of the target vehicle 20i on the basis of the front and rear direction density difference ΔD (=Df−Dr), the departure determination unit 102 according to the other embodiment may adjust the departure time of the target vehicle 20i, for example, on the basis of only one of the front direction density Df and the rear direction density Dr.

For example, the departure determination unit 102 may adjust the departure time at the stop station of the target vehicle 20i on the basis of a magnitude relationship between the front direction density Df and a predetermined front direction density threshold value Dfth (Dfth is a value equal to or greater than 0). More specifically, when the front direction density Df is greater than the predetermined front direction density threshold value Dfth (Df>Dfth), the departure determination unit 102 may suspend the transmission of the departure instruction until the front direction density Df is equal to or smaller than the front direction density threshold value Dfth to delay the departure time at the stop station of the target vehicle 20i. Conversely, when the front direction density Df is smaller than the predetermined front direction density threshold value Dfth (Df<Dfth), the departure determination unit 102 advances a transmission time of the departure instruction until the front direction density Df is equal to or greater than the front direction density threshold value Dfth to advance the departure time at the stop station of the target vehicle 20i.

Similarly, the departure determination unit 102 may adjust the departure time at the stop station of the target vehicle 20i on the basis of a magnitude relationship between the rear direction density Dr and a predetermined rear direction density threshold value Drth (Drth is a value equal to or greater than 0). More specifically, when the rear direction density Dr is smaller than the predetermined rear direction density threshold value Drth (Dr<Drth), the departure determination unit 102 may suspend the transmission of the departure instruction until the rear direction density Dr is equal to or greater than the rear direction density threshold value Drth to delay the departure time at the stop station of the target vehicle 20i. Conversely, when the rear direction density Dr is greater than the predetermined rear direction density threshold value Drth (Dr>Drth), the departure determination unit 102 may advance a transmission time of the departure instruction until the rear direction density Dr is equal to or smaller than the rear direction density threshold value Drth to advance the departure time at the stop station of the target vehicle 20i.

Thus, even when the operation management of the respective vehicles 201 to 20n is performed on the basis of only any one of the front direction density Df and the rear direction density Dr, if the provision of the transportation service becomes nonuniform, an effect of advancing a time until this is resolved is obtained. Further, since information to be referred to in the operation management of the respective vehicles 201 to 20n is only any one of the front direction density Df and the rear direction density Dr, a load of the process in each of the vehicle position acquisition unit 100, the density calculation unit 101, and the departure determination unit 102 can be reduced.

Further, while the operation management device 10 according to the present embodiment adjusts the departure time at the stop station of the target vehicle 20i to obtain effects of uniformizing the vehicle spacing of the respective vehicles 201 to 20n, the operation management device 10 according to the present embodiment is not limited to this process when uniformizing the vehicle spacing of the respective vehicles 201 to 20n. For example, the operation management device 10 decreases the travel speed of the target vehicle 20i or stops the vehicle between stations, instead of adjusting the departure time of the stop station when uniformizing the vehicle spacing of the respective vehicles 201 to 20n.

Second Embodiment

Next, a vehicular traffic system according to a second embodiment of the present invention will be described. Since a functional configuration of a vehicular traffic system 1 according to the second embodiment is the same as that of the vehicular traffic system 1 (FIG. 1) according to the first embodiment, description thereof is omitted.

The vehicular traffic system 1 according to the second embodiment is different from that of the first embodiment in a process flow executed by the operation management device 10. Here, the operation management device 10 according to the first embodiment performs a process flow in which the operation management device 10 waits for the front and rear direction density difference ΔD to be equal to or smaller than the predetermined density difference threshold value α (ΔD≤α) on the basis of both pieces of information including the front direction density Df and the rear direction density Dr, and then, transmits the departure instruction to the target vehicle 20i, as described above. On the other hand, the departure determination unit 102 according to the second embodiment calculates a time for which the target vehicle 20i should wait at the stop station (waiting time Tw) from a value of the front and rear direction density difference ΔD calculated from the front direction density Df and the rear direction density Dr, and transmits the departure instruction when the waiting time Tw has elapsed.

The departure determination unit 102 calculates, for example, the waiting time Tw as shown in Equation (1) on the basis of the front and rear direction density difference ΔD.

$$Tw = q \cdot \Delta D (\Delta D \geq 0)$$

$$Tw = 0 (\Delta D < 0) \qquad \text{[Equation 1]}$$

Here, the value q is a predetermined coefficient having a value equal to or greater than 0. According to Equation (1), as the front and rear direction density difference ΔD of the target vehicle 20i increases, that is, as the front is "denser" than the rear, the waiting time Tw of the target vehicle 20i increases. Thus, when density of the other vehicles 201 to 20n is small before and after the target vehicle 20i, the waiting time Tw is set to be small, and when the density of the other vehicles 201 to 20n is great, the waiting time Tw is accordingly set to be great. Accordingly, the effect of solving the nonuniformity of the operation of vehicles 201 to 20n is obtained. Further, when the front and rear direction density difference ΔD is smaller than 0 (that is, when the rear is "denser" than the front), the waiting is not performed (Tw=0). For the coefficient q, an optimal constant obtained from, for example, an empirical rule or a simulation result may be selected.

Further, the coefficient q may be, for example, a variable based on a "front inter-vehicle distance Lf" and a "rear inter-vehicle distance Lr" of the target vehicle 20i. Here, the "front inter-vehicle distance Lf" is an inter-vehicle distance between the target vehicle 20i and the other vehicles 201 to 20n traveling in the nearest position in front in the travel direction of the target vehicle 20i. The "rear inter-vehicle distance Lr" is an inter-vehicle distance between the target vehicle 20*i* and other vehicles 201 to 20*n* traveling in the nearest position at the rear in the travel direction of the target vehicle 20*i*. In this case, the departure determination unit 102 may calculate the coefficient q as shown in Equation (2) on the basis of the front inter-vehicle distance Lf and the rear inter-vehicle distance Lr.

$$q=q'\cdot(Lf-Lr)(Lf-Lr\geq 0)$$

$$q=0(Lf-Lr<0) \quad \text{[Equation 2]}$$

Here, the value q' is a predetermined coefficient having a value equal to or greater than 0. According to Equation (2), as the front inter-vehicle distance Lf is greater than the rear inter-vehicle distance Lr, the value of the coefficient q tends to increase and the waiting time Tw tends to increase. Conversely, when the front inter-vehicle distance Lf is smaller than the rear inter-vehicle distance Lr, the value of the coefficient q tends to decrease and the waiting time Tw tends to decrease. Further, when the rear inter-vehicle distance Lr is greater than the front inter-vehicle distance Lf, the coefficient q is set to 0 and, in this case, waiting is not performed (Tw=0). Effects of the process in which the departure determination unit 102 determines the waiting time Tw of the target vehicle 20*i* according to such an algorithm will be described below.

(Process Flow of Operation Management Device According to Second Embodiment)

Figure 6:
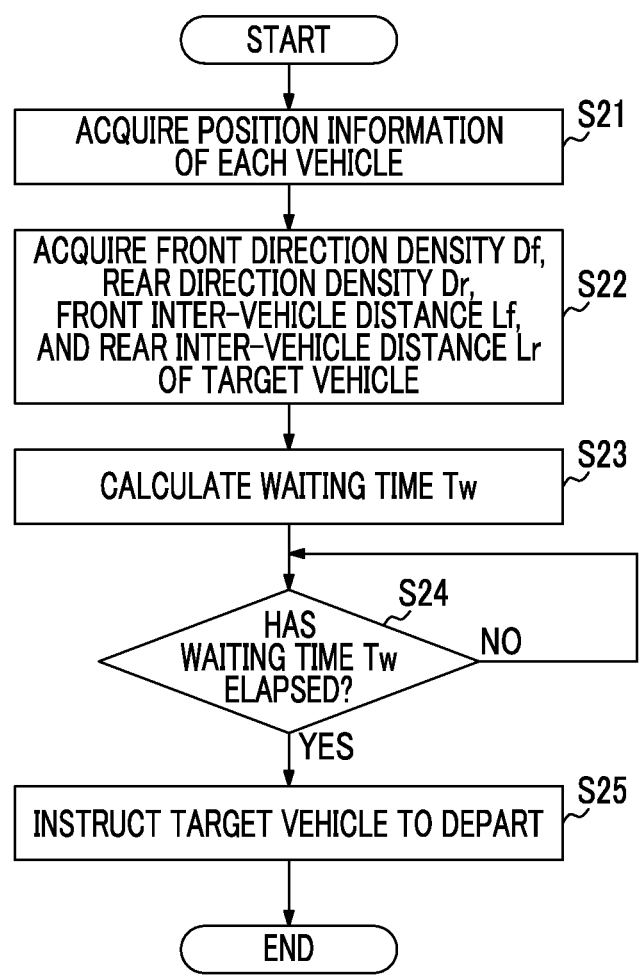
FIG. 6 is a flowchart illustrating a process flow of an operation management device according to a second embodiment of the present invention.

FIG. 6 is a flowchart illustrating a process flow of the operation management device according to the second embodiment of the present invention.

The operation management device 10 according to the present embodiment executes the process flow (FIG. 6) to be described below. Further, the process flow of FIG. 6 is a process flow until the departure instruction is transmitted to the target vehicle 20*i* which stops at a predetermined station.

First, the vehicle position acquisition unit 100 of the operation management device 10 acquires the position information of each of the vehicles 201 to 20*n* traveling along the track 3 (step S21).

Then, the density calculation unit 101 calculates the front direction density Df and the rear direction density Dr of the target vehicle 20*i* on the basis of the position information of each of the vehicles 201 to 20*n* acquired in step S21. Further, the density calculation unit 101 acquires the front inter-vehicle distance Lf and the rear inter-vehicle distance Lr of the target vehicle 20*i* (step S22). Also, the departure determination unit 102 calculates the front and rear direction density difference ΔD on the basis of the front direction density Df and the rear direction density Dr calculated in step S22, and calculates the coefficient q (Equation (2)) on the basis of the front inter-vehicle distance Lf and the rear inter-vehicle distance Lr. Also, the departure determination unit 102 calculates the waiting time Tw on the basis of Equation (1) (step S23). Here, when the calculated waiting time Tw is less than the minimum stop time Tmin determined to ensure the time taken for a passenger to get on or off, the departure determination unit 102 sets the minimum stop time Tmin to the waiting time Tw.

Then, the departure determination unit 102 first determines whether the waiting time Tw has elapsed after the target vehicle 20*i* arrives at the stop station (step S24). Here, when the waiting time Tw has not elapsed ("NO" in step S24), the process does not proceed to the next step until the waiting time Tw elapses. When the waiting time Tw has elapsed ("YES" in step S24), the departure determination unit 102 transmits the departure instruction to the target vehicle 20*i* (step S25).

The operation management device 10 executes the above-described process flow to realize a process in which the departure instruction is transmitted to the target vehicle 20*i* at a time at which the waiting time Tw obtained using a predetermined calculation equation on the basis of the front and rear direction density difference ΔD, the front inter-vehicle distance Lf, and the rear inter-vehicle distance Lr has elapsed.

According to the process flow (FIG. 6) as described above, the operation management device 10 performs the acquisition of the position information of the vehicles 201 to 20*n* (step S21) and the calculation of various parameters (Df, Dr, Lf, and Lr) (step S22), and then, waits for the waiting time Tw calculated according to these. Accordingly, the operation management device 10 according to the present embodiment may perform, once, a process of the acquisition of the position information of the vehicles 201 to 20*n* in the vehicle position acquisition unit 100 and the calculation of the various parameters (Df, Dr, Lf, and Lr) in the density calculation unit 101 in the process of adjusting the departure time of the target vehicle 20*i*. Accordingly, the repeated acquisition of the position information and the repeated calculation of the various parameters (Df and Dr) (FIG. 3) are not performed unlike the operation management device according to the first embodiment, and thus, it is possible to reduce a processing load of the operation management device 10 as compared to the first embodiment.

(Effects of Operation Management Device According to Second Embodiment)

Figure 7:
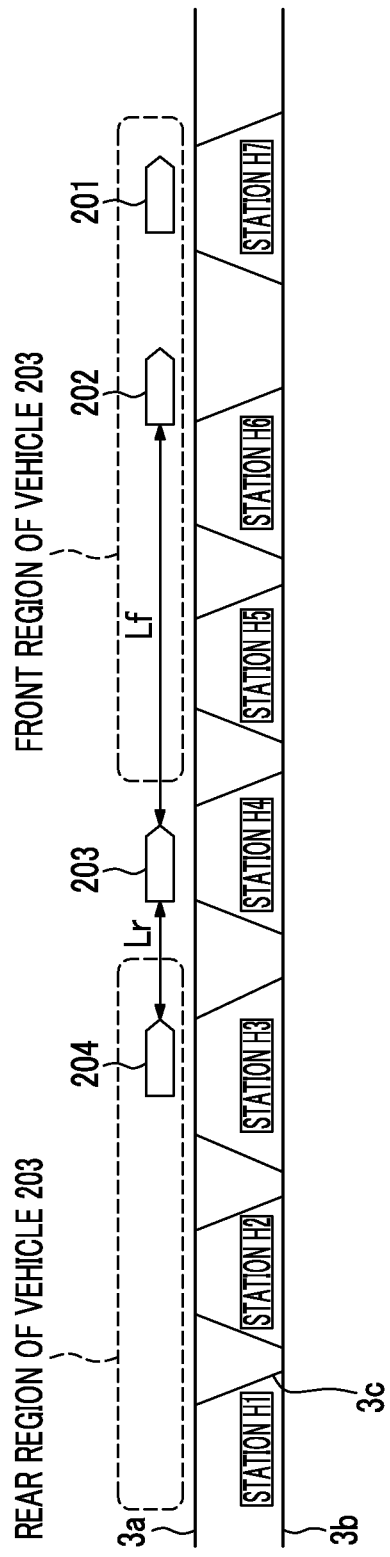
FIG. 7 is a diagram illustrating effects of a vehicular traffic system according to the second embodiment of the present invention.

FIG. 7 is a diagram illustrating effects of the vehicular traffic system according to the second embodiment of the present invention. Here, vehicles 201 to 204 illustrated in FIG. 7 are vehicles that travel along a first track 3*a* from the left of a paper surface to the right. Further, in the example described with reference to FIG. 7, the example is focused on an operation of the vehicle 203 as a target vehicle 20*i*, and it is assumed that kf=kr=3 is set, similarly to the example illustrated in FIGS. 2, 4A, 4B, 5A, and 5B.

Effects of the operation management performed in consideration of the front inter-vehicle distance Lf and the rear inter-vehicle distance Lr will be described with reference to FIG. 7.

As illustrated in FIG. 7, for the vehicle 203 stop at a station H4, two vehicles including the vehicle 201 and the vehicle 202 are present in a front region of the vehicle 203. Further, vehicle spacing therebetween is smaller than normal vehicle spacing. Further, as illustrated in FIG. 7, an inter-vehicle distance between the vehicle 202 and the vehicle 203 is great, and a front inter-vehicle distance Lf that is a distance between the vehicle 203 and the nearest vehicle 202 in front in the travel direction of the vehicle 203 is relatively great. On the other hand, only one vehicle including a vehicle 204 is present in a rear region of the vehicle 203. Further, as illustrated in FIG. 7, the vehicle spacing between the vehicle 204 and the vehicle 203 is small, and a rear inter-vehicle distance Lr that is a distance between the vehicle 203 and the nearest vehicle 204 at the rear in the travel direction of the vehicle 203 is smaller than the front inter-vehicle distance Lf (Lf−Lr<0).

Here, when the departure determination unit 102 simply calculates the waiting time Tw on the basis of only the front direction density Df and the rear direction density Dr of the vehicle 203, the front and rear direction density difference ΔD has a positive value in the state illustrated in FIG. 7, and thus, the vehicle 203 waits for a predetermined waiting time Tw at the station H4 (Equation (1)). However, in the case of FIG. 7, in fact, the front inter-vehicle distance Lf of the vehicle 203 is greater than the rear inter-vehicle distance Lr, and the vehicle 203 rather enters a state in which vehicle spacing between the vehicle 203 and the rear vehicle 204 is small. In such a state, when the waiting time Tw is generated for the vehicle 203, a more overcrowded state (overcrowding state) may be caused at the rear of the vehicle 203. Therefore, in such a case, it is preferable to rapidly cause the vehicle 203 to depart by setting the waiting time Tw to 0 even when the front direction density Df is high. That is, the operation management device 10 according to the present embodiment can select an appropriate operation even when the vehicle spacing between the vehicle 203 and the nearest vehicle in front in the travel direction of the vehicle 203 is great despite the high front direction density Df.

Thus, when the waiting time Tw is calculated, the waiting time Tw is weighted according to not only the front direction density Df and the rear direction density Dr, but also the rear inter-vehicle distance Lr and the front inter-vehicle distance Lf. Thus, when provision of a transportation service is nonuniform, the waiting time is determined more accurately. Accordingly, it is possible to rapidly uniformize the provision of the transportation service.

Third Embodiment

Next, a vehicular traffic system according to a third embodiment of the present invention will be described.

FIG. 8 is a diagram illustrating a functional configuration of a vehicular traffic system according to the third embodiment of the present invention. Among functional components of a vehicular traffic system 1 according to the third embodiment, the same functional components as those of the vehicular traffic system 1 according to the first embodiment (FIG. 1) are denoted with the same reference signs, and description thereof is omitted.

As illustrated in FIG. 8, the operation management device 10 of the vehicular traffic system 1 according to the present embodiment is configured to further include a path determination unit 103, in addition to the functional components of the vehicular traffic system 1 according to the first embodiment. Here, the path determination unit 103 is a functional unit that designates a travel path on the track 3 for each of the vehicles 201 to 20n. The path determination unit 103 transmits predetermined path information to each of the vehicles 201 to 20n according to operation situation. Here, the path information is information for specifying a path of one of branches when there are the branches or the like in the track 3. When the vehicles 201 to 20n receive the path information, the vehicles 201 to 20n select a path specified in the path information and travel along the path. Further, the path determination unit 103 also outputs the same path information to the density calculation unit 101. For example, the density calculation unit 101 receiving the path information transmitted to the predetermined target vehicle 20i sets the vehicle 20i front region and the vehicle 20i rear region on the basis of the travel path designated in the path information. Also, the density calculation unit 101 calculates the front direction density Df on the basis of the vehicle 20i front region set here and the rear direction density Dr on the basis of the vehicle 20i rear region. By doing so, when the travel path of the target vehicle 20i is changed by the path determination unit 103, the density calculation unit 101 can calculate the front direction density Df and the rear direction density Dr for the target vehicle 20i on the basis of the travel path set newly each time.

Further, the vehicle position acquisition unit 100 according to the present embodiment has a function of acquiring a travel direction of the plurality of vehicles 201 to 20n. Specifically, the vehicle position acquisition unit 100 first detects transition of the position of the vehicles 201 to 20n indicated by the position information received from the vehicles 201 to 20n. Further, the vehicle position acquisition unit 100 determines the travel direction of the vehicles 201 to 20n to be, for example, "up" or "down" from the transition of the position of the vehicles 201 to 20n in the path by referring to the path information of each of the vehicles 201 to 20n from the path determination unit 103. Further, means with which the vehicle position acquisition unit 100 acquires the travel direction of the vehicles 201 to 20n is not limited to the above-described means, and may be any means as long as there is an effect of obtaining travel direction information of the vehicles 201 to 20n.

Figure 9A:
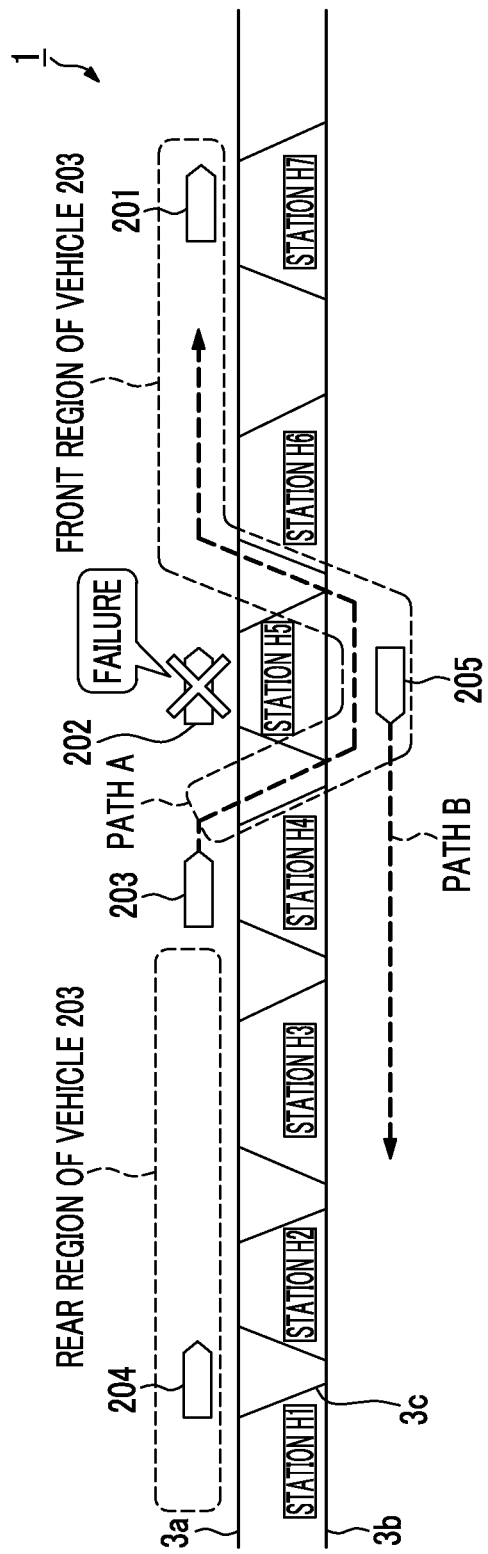
FIG. 9A is a first diagram illustrating effects of the vehicular traffic system according to the third embodiment of the present invention.
Figure 9B:
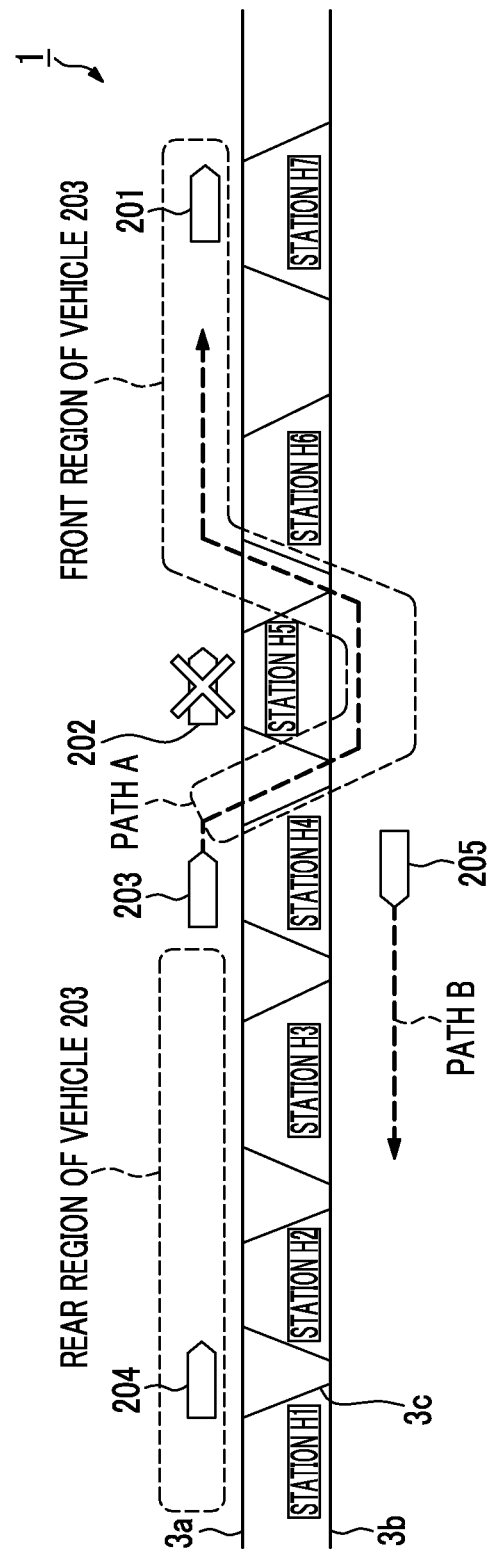
FIG. 9B is a second diagram illustrating effects of the vehicular traffic system according to the third embodiment of the present invention.

FIGS. 9A and 9B are first and second diagrams illustrating effects of a vehicular traffic system according to the third embodiment of the present invention. Further, vehicles 201 to 204 illustrated in FIGS. 9A and 9B are vehicles traveling a first track 3a from the left of a paper surface to the right. On the other hand, a vehicle 205 is a vehicle traveling along a second track 3b different from the first track 3a from the right of the paper surface to the left. In an example to be described with reference to FIGS. 9A and 9B, the example is focused on an operation of the vehicle 203 as a target vehicle 20i, and it is assumed that kf=kr=3 and α=0 are set, similarly to the example illustrated in FIG. 2 or the like. Further, the process flow of the operation management device 10 according to the third embodiment is assumed to be the same as the process flow (FIG. 3) in the first embodiment.

Effects of the operation management performed in consideration of the change in the path will be described with reference to FIGS. 9A and 9B.

As illustrated in FIG. 9A, two vehicles including a vehicle 201 stopping at a station H7 on a first track 3a and a vehicle 202 stopping at a station H5 are present in front in a travel direction of the vehicle 203 stop at a station H4. Further, only one vehicle including a vehicle 204 is present at the rear in the travel direction of the vehicle 203 (in a rear region of vehicle 203). Further, the vehicle 205 traveling along the second track 3b in a direction opposite to the vehicle 203 stops at the station H5 in front in the travel direction of the vehicle 203.

As illustrated in FIG. 9A, the nearest vehicle 202 in front in the travel direction of the vehicle 203 is assumed to have been unable to operate at the station H5 due to vehicle failure. Then, the vehicle 203 is unable to pass through a path on the first track 3a that has been set initially. Here, the path determination unit 103 transmits path information indicating a new path (path A) to the vehicle 203 so that the vehicle 203 continues to operate. Here, the path determination unit 103 sets, for example, a path (path A) for passing through the branch 3c between the station H4 and the station H5 to enter the second track 3b and passing through the branch 3c between the station H5 and the station H6 to return to the first track 3a, as illustrated in FIG. 9A. That is, the path determination unit 103 transmits, to the vehicle 203, the path information indicating the path (path A) that bypasses the vehicle 202 that is unable to operate due to failure.

Then, the path determination unit 103 also outputs the path information indicating the same path (path A) to the density calculation unit 101. When the density calculation unit 101 receives the path information, the density calculation unit 101 detects that the path of the vehicle 203 has been changed. Also, the density calculation unit 101 resets the front region of the vehicle 203 for the path that has been newly set for the vehicle 203. Here, the front region of the vehicle 203 is reset according to the newly set path A. That is, the front region of the vehicle 203 is a range corresponding to three stations in front in the travel direction along the path for passing through the branch 3c between the station H4 and the station H5 to enter the second track 3b and passing through the branch 3c between the station H5 and the station H6 to return to the first track 3a, as illustrated in FIG. 9A.

When the density calculation unit 101 resets the front region of the vehicle 203, the density calculation unit 101 immediately calculates the front direction density Df on the basis of the newly set front region of the vehicle 203. Here, the vehicle 201 stopping at the station H7 and the vehicle 205 traveling along the second track 3b are included in the reset front region of the vehicle 203, as illustrated in FIG. 9A. Accordingly, the density calculation unit 101 calculates the front direction density Df to be "2/3". In this case, since the rear direction density Dr is "1/3," the vehicle 203 waits at the station H4.

Next, it is assumed that the vehicle 205 departs from the station H5 and travels toward the station H4 along a path B, as illustrated in FIG. 9B. Then, the vehicle 205 is out of the front region of the vehicle 203, and only the vehicle 201 belongs to the front region of the vehicle 203. As a result, the front direction density Df becomes 1/3, and the vehicle 203 resumes the operation along the path A.

Thus, the path determination unit 103 according to the present embodiment sequentially outputs the path information indicating the changed path to the density calculation unit 101, and thus, the density calculation unit 101 can calculate the front direction density Df for the newly selected path. Accordingly, even when the change of the path is instructed, the departure time of each of the vehicles 201 to 20n is adjusted so that the vehicle spacing is uniform on the basis of the front direction density Df and the rear direction density Dr that have been newly calculated.

Further, the vehicular traffic system 1 according to the present embodiment may further have the following functions.

Specifically, the vehicle position acquisition unit 100 acquires position information of the plurality of vehicles 201 to 20n and acquires travel direction information indicating a travel direction of each of the vehicles 201 to 20n. Also, the density calculation unit 101 receives the travel direction information, and determines whether there is a vehicle traveling in a direction opposite to the travel direction of the target vehicle 20i in front in the travel direction of the track 3 along which the target vehicle 20i travels. Also, when it is determined that there is a vehicle traveling in a direction opposite to the travel direction of the target vehicle 20i, the operation management device 10 performs a predetermined correction process of increasing the front direction density Df for the target vehicle 20i. Here, in the example of FIGS. 9A and 9B, the target vehicle 20i is a vehicle 203, and the "vehicle traveling in a direction opposite to the travel direction of the target vehicle 20i" is a vehicle 205.

Here, the case in which the vehicle 205 travels along the path B and is out of the front region of the vehicle 203 while the vehicle 203 is stopping at the station H4, and as a result, the front direction density Df of the vehicles 203 decreases and the vehicle 203 can depart from the station H4 in the example illustrated in FIGS. 9A and 9B has been described. However, in the example illustrated in FIG. 9A, in addition to the above description, the front direction density Df of the vehicle 203 decreases and the vehicle 203 can depart from the station H4 even when the vehicle 201 departs from the station H7 before the vehicle 205 departs from the station H5. In this case, since the vehicle 205 traveling in an opposite direction is present in front in the travel direction of the vehicle 203, it is dangerous for the vehicle 203 to directly start the operation, and this should be prevented from the beginning.

Therefore, when it is determined that there is the vehicle 205 traveling in a direction opposite to the travel direction of the vehicle 203, the density calculation unit 101 according to the present embodiment performs a correction to increase the front direction density Df. That is, the density calculation unit 101 performs a correction process such that a count of the number of vehicles for the vehicle 205 is greater than 1. In the example of FIGS. 9A and 9B, for example, the density calculation unit 101 performs the correction process in which four vehicles rather than one vehicle are regarded as being present for the vehicle 205 traveling in the opposite direction of the vehicle 203, and performs calculation of the front direction density Df. Thus, the front direction density Df is calculated to be at least Df=4/3 as long as there is one vehicle 205. That is, as long as there is the vehicle 205, the vehicle 203 does not depart from the station H4 if the rear direction density Dr is not 4/3 or more. Further, in the above-described correction process (for example, the process of regarding one vehicle as four vehicles), the front direction density Df calculated after the correction (for example, Df=4/3) is set to a value at which the rear direction density Dr is not equal to or greater than such a value in terms of the operation management of the vehicular traffic system 1. Thus, in the state illustrated in FIG. 9A, even when the vehicle 201 has departed the station H7 toward the front station (a station H8 that is not illustrated) earlier than the vehicle 205, the vehicle 203 actually waits at the station H4 until the vehicle 205 departs from the station H5 along the path B.

Thus, the vehicular traffic system 1 according to the present embodiment enables change of a dynamic path according to a change in an operation situation due to unexpected vehicle failure or the like, and can provide a more secure transportation service.

Figure 10A:
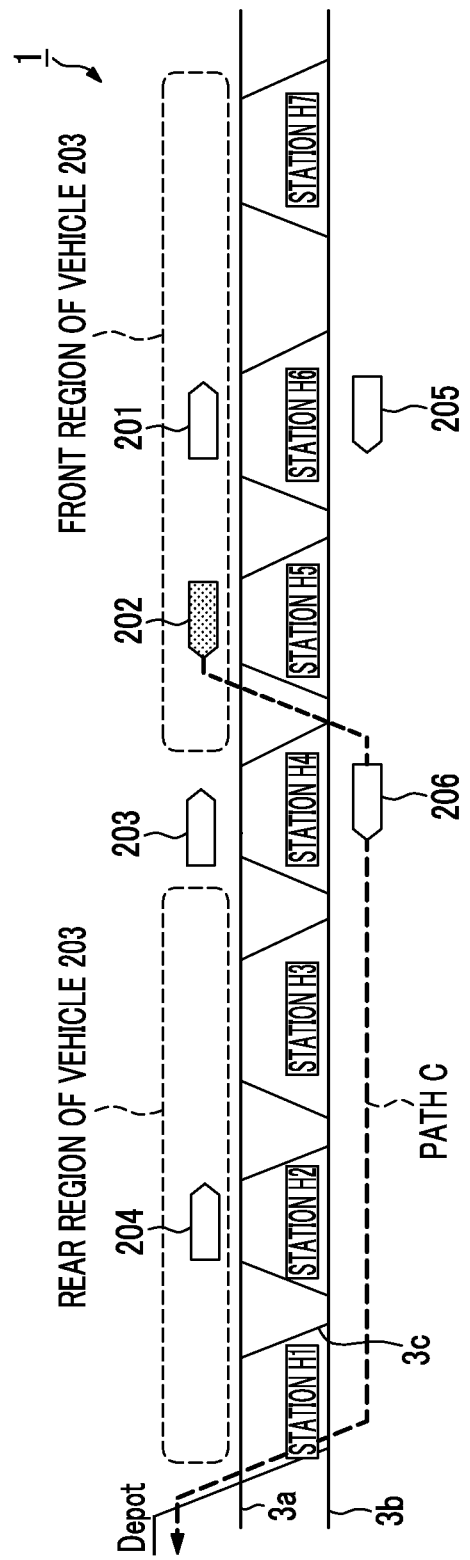
FIG. 10A is a third diagram illustrating effects of the vehicular traffic system according to the third embodiment of the present invention.
Figure 10B:
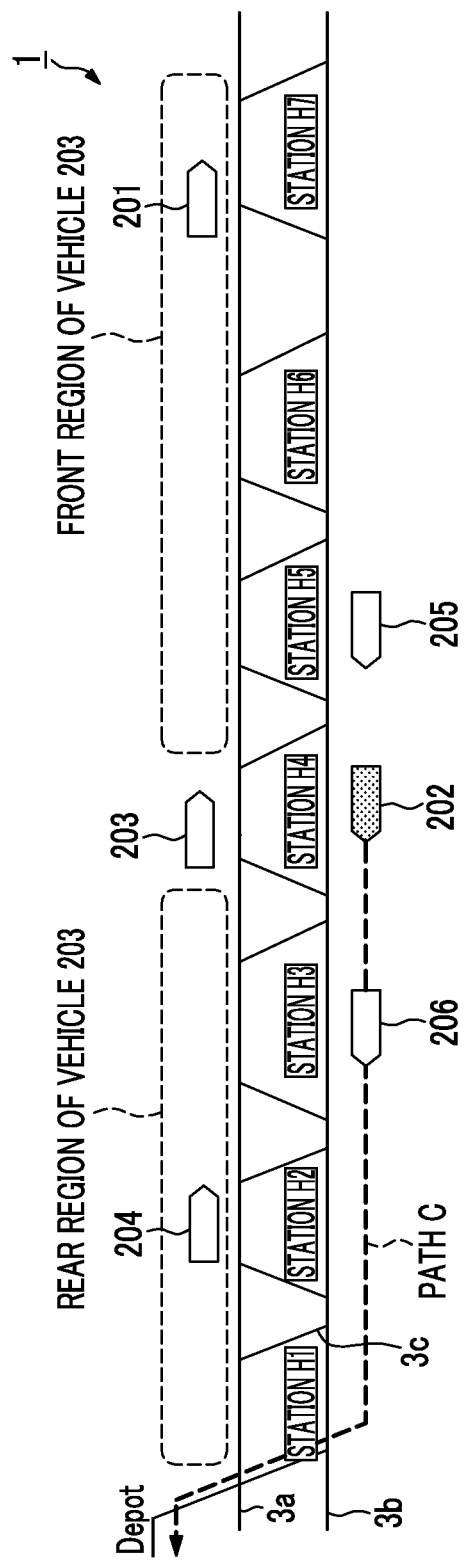
FIG. 10B is a fourth diagram illustrating effects of the vehicular traffic system according to the third embodiment of the present invention.

FIGS. 10A and 10B are third and fourth diagrams illustrating effects of the vehicular traffic system according to the third embodiment of the present invention. Further, vehicles 201 and 203 to 204 illustrated in FIGS. 10A and 10B are vehicles that travel along a first track 3a from the left of a paper surface to the right. On the other hand, vehicles 205 and 206 are vehicles that travel along a second track 3b different from the first track 3a from the right of the paper surface to the left. In an example described with reference to FIGS. 10A and 10B, the example is focused on an operation of the vehicle 203 as a target vehicle 20i, and it is assumed that kf=kr=3 and α=0 are set, similarly to the example illustrated in FIG. 2 or the like. Further, a process flow of the operation management device 10 according to the third embodiment is assumed to be the same as the process flow (FIG. 3) in the first embodiment.

According to the vehicular traffic system 1 of the third embodiment, it is possible to further cope with the following situation.

In an example illustrated in FIG. 10A, for a vehicle 203 stopping at a station H4, two vehicles including a vehicle 201 stopping at a station H7 on a first track 3a and a vehicle 202 stopping at a station H5 are present in a front region of the vehicle 203. Further, only one vehicle including a vehicle 204 is present in a rear region of the vehicle 203. Further, a vehicle 206 and a vehicle 205 traveling along a second track 3b in an opposite direction of the vehicle 203 stop at a station H4 and a station H6, respectively.

In FIG. 10A, the vehicle 202 is a vehicle traveling along the first track 3a in the same direction as the vehicle 203, but it is assumed here that the path determination unit 103 resets a path (path C) for withdrawing the vehicle 202 to a vehicle depot (FIGS. 10A and 10B). Then, in a step of FIG. 10A, the vehicle 202 traveling in an opposite direction is present in a front region of the vehicle 203, and thus, when the front direction density Df is calculated, a correction process to increase the front direction density Df (for example, a process of regarding one vehicle 202 as four vehicles) is performed, and the vehicle 203 waits at the station H4 until the vehicle 202 is out of the front region of the vehicle 203. Further, the vehicle 204 similarly waits at the station H2 until the vehicle 202 is out of a front region (not illustrated) of the vehicle 204.

The vehicle 202 then travels to the station H4 along the second track 3b, as illustrated in FIG. 10B.

Then, the density calculation unit 101 detects that the front direction density Df decreases due to the vehicle 202 being out of the front region of the vehicle 203, and the departure determination unit 102 transmits the departure instruction to the vehicle 203. Meanwhile, the vehicles 205 and 206 traveling along the second track 3b travel to the station H5 and the station H3, respectively. However, the vehicle 202 enters the second track 3b to be between the vehicle 205 and the vehicle 206, as illustrated in FIG. 10B. Then, the front direction density Df of the vehicle 205 suddenly increases. As a result, the vehicle 205 waits at the station H5 until the front direction density Df decreases.

When there is a vehicle that suddenly turns back to the depot, it is necessary to recreate a timetable for all vehicles in the related art, whereas according to the vehicular traffic system 1 of the present embodiment, if only a vehicle turning back to the depot and its path are designated, vehicle spacing between the vehicle and the other vehicle is automatically adjusted. Accordingly, an effect of reducing an effort when the vehicle turns back to the depot is obtained.

Further, while the vehicular traffic systems 1 according to the first to third embodiments described above have all been described as the aspect in which the single ground facility, that is, the operation management device 10 controls the operation of all the vehicles 201 to 20n, the vehicular traffic system 1 according to another embodiment of the present invention is not limited to such an aspect. For example, the vehicular traffic system 1 according to the other embodiment may be an aspect in which a plurality of different operation management devices 10 are included as ground facilities. Also, for example, the vehicular traffic system 1 may be an aspect in which the respective operation management devices 10 assigned to respective predetermined sections of the track 3 may control the operations of the vehicles 201 to 20n traveling in the predetermined section.

Fourth Embodiment

Next, a vehicular traffic system according to a fourth embodiment of the present invention will be described.

FIG. 11 is a diagram illustrating a functional configuration of a vehicular traffic system according to the fourth embodiment of the present invention. Further, among the functional compositions of a vehicular traffic system 1 according to the fourth embodiment, the same functional components as those in the vehicular traffic system 1 according to the first embodiment (FIG. 1) are denoted with the same reference signs, and description thereof is omitted.

The vehicular traffic system 1 according to the fourth embodiment of the present invention does not include the operation management device 10 that is a ground facility in the first to third embodiments. Also, each of the vehicles 201 to 20n includes the vehicle position acquisition unit 100, the density calculation unit 101, and the departure determination unit 102 included in the operation management device 10 in the first to third embodiments (while the functional components of only the vehicle 202 are described in FIG. 11 for convenience, each of the vehicles 201 to 20n includes the same functional components as the vehicle 202).

Here, according to the vehicular traffic system 1 of the present embodiment, each of the vehicles 201 to 20n can autonomously adjust the vehicle spacing while communicating with the other vehicles 201 to 20n. Specifically, the vehicle position acquisition units 100 of the vehicles 201 to 20n communicate with each other and acquire the position information for the respective vehicles 201 to 20n (step S11 in FIG. 3). Then, the density calculation units 101 provided in the respective vehicles 201 to 20n calculate the front direction density Df and the rear direction density Dr of the own vehicles on the basis of the position information of the respective vehicles 201 to 20n (step S12 in FIG. 3). Also, the departure determination units 102 provided in the respective vehicles 201 to 20n perform a determination of departure instruction or departure suspending for the own vehicle on the basis of the front direction density Df and the rear direction density Dr for the own vehicle (steps S13 and S14 in FIG. 3).

As described above, according to the vehicular traffic system 1 of the present embodiment, the respective vehicles 201 to 20n can recognize a positional relationship among them and autonomously operate while adjusting the vehicle spacing between the own vehicle and the other vehicle on the basis of the densities of the vehicles in front and at the rear. Accordingly, it is not necessary to perform an operation using a ground facility (operation management device 10) that centrally manages the entire operation of the vehicles 201 to 20n, and it is possible to achieve distribution of an operation management process. If the distribution of the operation management process is made in this way, influence on an operation of the vehicular traffic system 1 is minimized even when any of each operation management system (the vehicles 201 to 20n in the present embodiment) fails. Accordingly, it is possible to improve reliability of the entire vehicular traffic system 1.

Further, each of the vehicles 201 to 20n of the vehicular traffic system 1 according to the fourth embodiment of the present invention may further include the function (operation control based on the front inter-vehicle distance Lf and the rear inter-vehicle distance Lr) described in the second embodiment or the function (dynamic path changing process in the path determination unit 103) described in the third embodiment.

The vehicular traffic system 1 according to the first to fourth embodiments described above may further include a passenger information system (PIS) as a ground facility. A conventional PIS displays a scheduled arrival time of a vehicle on a screen provided at a station on the basis of a predetermined timetable, whereas in the case of the vehicular traffic system 1 according to the present embodiment, since an operation that does not use the timetable is performed, an arrival vehicle and an arrival time cannot be recognized on the basis of only the timetable information. Therefore, the PIS according to the present embodiment performs a process of receiving identification information, position information, and path information of the target vehicle 20*i* from the operation management device 10 (each of the vehicles 201 to 20*n* in the case of the sixth embodiment), calculating a scheduled arrival time for each station of the target vehicle 20*i*, and displaying the calculated scheduled arrival time on a display screen installed in each station. Here, the identification information of the target vehicle 20*i* may be, for example, a unique ID (IDentification) number that can specify the target vehicle 20*i*. After specifying the target vehicle 20*i* from the identification information, the PIS according to the present embodiment can easily estimate a time required until at least the next stop station from, for example, a travel speed of the target vehicle 20*i* when the position information and the path information can be recognized.

Further, the PIS of the present embodiment may further calculate various parameters such as the front direction density from Df, the rear direction density Dr, the front inter-vehicle distance Lf, and the rear inter-vehicle distance Lr using the density calculation unit 101, and estimate the scheduled arrival time of the target vehicle 20*i* on the basis of the parameters. Specifically, the PIS according to the present embodiment performs a process of calculating the waiting time T of the target vehicle 20*i* obtained using calculation equations in Equations (1) and (2) to estimate the scheduled arrival time at each station. By doing so, the passenger of the vehicular traffic system 1 can recognize the scheduled arrival time of the vehicles 201 to 20*n* that arrive at the station even when the respective vehicles 201 to 20*n* do not travel on the basis of the timetable. Each time various parameters such as the front direction density Df and the rear direction density Dr for the target vehicle 20*i* have changed according to the operating situation, the PIS according to the present embodiment may receive the respective parameters from the density calculation unit 101 and calculate a new scheduled arrival time. By doing so, the vehicular traffic system 1 can dynamically correspond to the operation situation of each of the vehicles 201 to 20*n* and provide the passengers with a more accurate scheduled arrival time.

Further, the vehicular traffic system 1 according to the present invention may be realized by the following embodiment.

Fifth Embodiment

Hereinafter, a vehicular traffic system according to a fifth embodiment of the present invention will be described with reference to the drawings.

Figure 12:
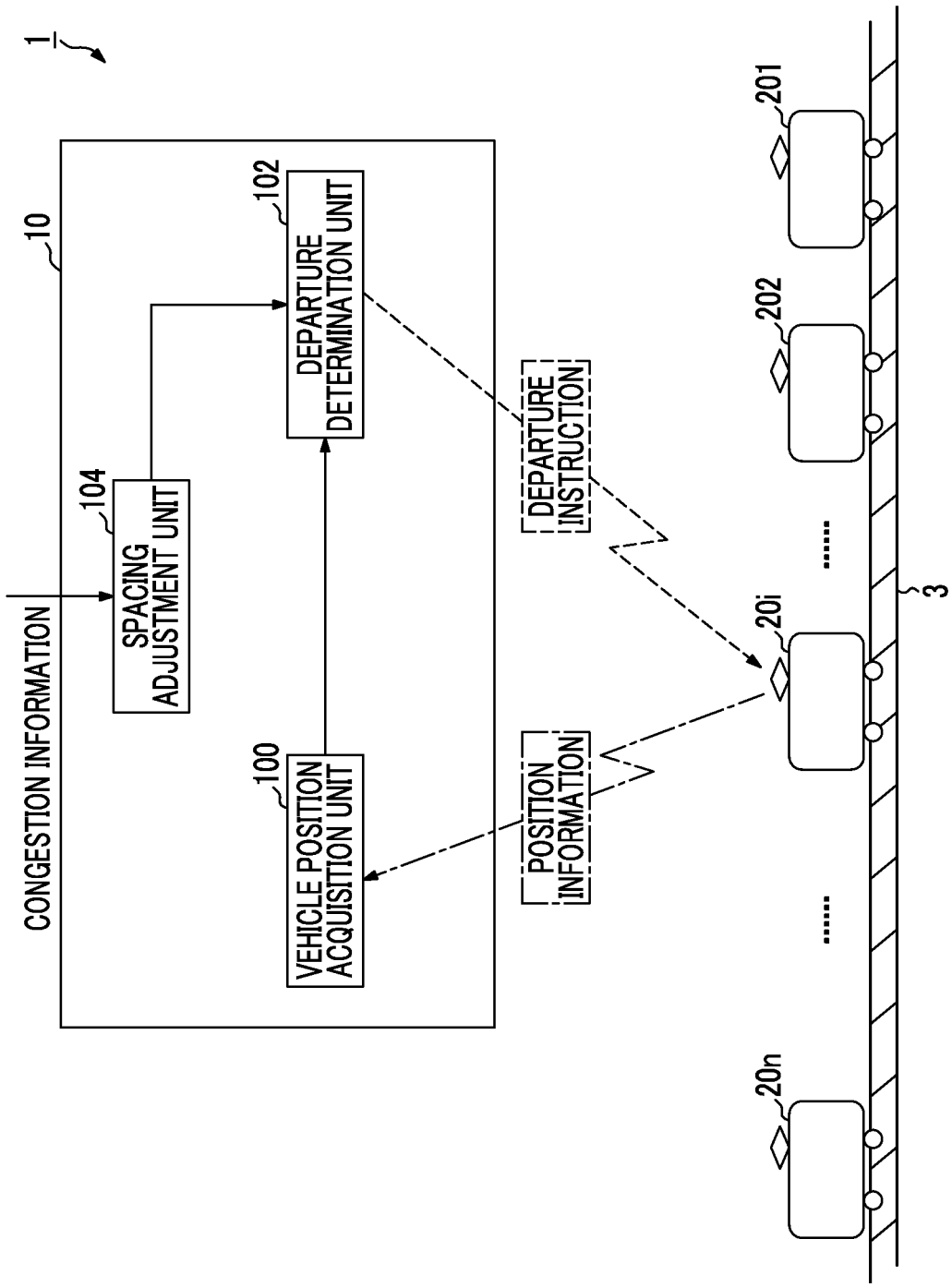
FIG. 12 is a diagram illustrating a functional configuration of a vehicular traffic system according to a fifth embodiment of the present invention.

FIG. 12 is a diagram illustrating a functional configuration of the vehicular traffic system according to a fifth embodiment of the present invention. In FIG. 12, reference sign 1 indicates a vehicular traffic system.
(Configuration of Entire Vehicular Traffic System)

First, an entire configuration of the vehicular traffic system 1 will be described.

As illustrated in FIG. 12, the vehicular traffic system 1 according to the present embodiment includes an operation management device 10, and a plurality of vehicles 201, 202, . . . , and 20*n* (n is an integer equal to or greater than 2) traveling along a track 3. The operation management device 10 is referred to as a ground facility, and is a device for controlling the operation of the plurality of vehicles 201, 202, . . . , and 20*n*.

The operation management device 10 according to the present embodiment is a functional unit that transmits a departure instruction to each of the vehicles 201, 202, . . . , and 20*n* on the basis of the determination of the departure determination unit 102 to be described below. The operation management device 10 transmits a departure instruction to each of the vehicles 201 to 20*n* using wireless communication means or the like. Each of the vehicles 201 to 20*n* operates on the basis of the departure instruction received from the operation management device 10.

Further, operation control based on a security device (interlocking device) or a signal is further added in the actual operation of the vehicle, but for simplification of the description of the present embodiment, a case in which the operation control of the vehicles 201 to 20*n* is simply performed on the basis of the operation management device 10 will be described here (a case in which the security device or the like is used will be described below with reference to FIG. 19).

The vehicles 201, 202, . . . , and 20*n* are a train traveling along a predetermined track 3 (line). The vehicles 201 to 20*n* travel while arriving at and departing from a plurality of stations (not illustrated in FIG. 12) provided along the track 3 according to an operation instruction received from the operation management device 10. Further, predetermined position detection devices (not illustrated) are provided at regular intervals in the track 3, and each of the vehicles 201 to 20*n* communicates with the position detection devices, and accordingly, can recognize a position on the track 3 in which the own vehicle is traveling.

This function will be described in greater detail. Each of the vehicles 201 to 20*n* includes its own line database. Also, each of the vehicles 201 to 20*n* has a function of measuring the number of tire rotations of the own vehicle to calculate a travel distance and recognizing a current position of the own vehicle. However, in this case, the current position recognized from the number of tire rotations may deviate from an actual position due to tire slip. Each of the vehicles 201 to 20*n* corrects the deviation through a comparison with a position detection device placed on the ground, and accurately recognizes a position on the track 3 in which the own vehicle is traveling.

Here, in the case of a normal vehicular traffic system, the timetable is determined so that a supply and demand balance is optimized, on the basis of the number of users (the number of passengers) and a possible riding amount of each vehicle. In general, when there are two timetables including a weekday timetable and a holiday timetable, any problems are not caused in provision of a daily transportation service. However, for example, if a special event such as a concert or an exhibition is held at any event site, an increase in the number of passengers only on that day may be specifically expected. In such a case, the operation based on a daily timetable causes a problem in that passengers cannot be transported. Accordingly, the vehicular traffic system 1 according to the present embodiment is a function of acquiring information ("congestion information" to be described below) estimated from, for example, content of the event, and intentionally creating a state in which vehicle spacing at a specific station is "dense" for suitability for situation of the congestion in advance.
(Configuration of Operation Management Device)

Next, a configuration of the operation management device 10 will be described.

As illustrated in FIG. 12, the operation management device 10 according to the present embodiment includes a vehicle position acquisition unit 100, a spacing adjustment unit 104, and a departure determination unit 102.

The vehicle position acquisition unit 100 is a functional unit that acquires positions of a plurality of vehicles 201 to 20n present on a track 3. Each of the vehicles 201 to 20n can communicate with a position detection device (not illustrated) provided on the track 3 to recognize a position on the track 3 in which the own vehicle is traveling, as described above. Also, the respective vehicles 201 to 20n sequentially transmit "position information" indicating a travel position of the own vehicle to the operation management device 10 through wireless communication. The vehicle position acquisition unit 100 of the operation management device 10 receives the position information of the respective vehicles 201 to 20n to acquire the positions of the vehicles 201 to 20n. Further, the vehicle position acquisition unit 100 may acquire not only the position information of each vehicle, but also information indicating the maximum number of passengers who can get on each vehicle. Further, in another embodiment, each of the vehicles 201 to 20n may transmit the position information to the operation management device 10 through wired communication.

The spacing adjustment unit 104 specifies a reference station at which the density of the presence of the plurality of vehicles 201 to 20n is high (destination station Hm (m is an integer equal to or greater than 2)) on the basis of the "congestion information" acquired from a predetermined information source, and sets the waiting time ωj for each station Hj at the rear of the destination station Hm (j is an integer equal to or greater than 1 and smaller than m), of the plurality of vehicles 201 to 20n that stop at the station Hj. Here, the "congestion information" is, specifically, information such as position requirements (for example, a nearest station) of an event site where an event (for example, a concert or an exhibition) or the like is held, the number of attending passengers estimated in advance, a start time of the event, and an end time thereof. A specific method of acquiring the congestion information will be described below.

The spacing adjustment unit 104 according to the present embodiment first specifies the destination station Hm on the basis of the congestion information. The destination station Hm is a station at which the congestion is predicted, that is, a nearest station of the event site. Also, the spacing adjustment unit 104 performs a process of increasing the density of the presence of the vehicles 201 to 20n in front of the destination station Hm. Further, "the density of the presence of the vehicles 201 to 20n" is the number of the vehicles 201 to 20n within a certain range of the track 3. That is, the spacing adjustment unit 104 increases the number of vehicles 201 to 20n within a certain range in front of the destination station Hm (increases the presence density), and thus, the vehicular traffic system can cope with passengers that locally temporarily increase at the destination station Hm.

The spacing adjustment unit 104 performs the following process in order to increase the density of the presence of the vehicles 201 to 20n. That is, the spacing adjustment unit 104 sets the waiting time ωj for each station Hj at the rear of the destination station Hm, of the plurality of vehicles 201 to 20n which stop at the station Hj at the rear of the destination station Hm. A specific method of setting the waiting time ωj will be described below. Further, "the station Hj at the rear of the destination station Hm" indicates each station at which the vehicles 201 to 20n stop before the vehicles 201 to 20n stop the destination station Hm. Here, when the vehicles 201 to 20n are assumed to stop at the stations in an order of the stations H1, H2, . . . , Hm−1, and Hm, the station Hj at the rear of the destination station Hm includes stations H1, H2, . . . , and Hm−1.

The departure determination unit 102 is a functional unit that adjusts the departure time at each station Hj at the rear of the plurality of vehicles 201 to 20n on the basis of the waiting time Tj set for each station Hj. Specifically, when the target vehicle 20i stops at the station Hj, the departure determination unit 102 performs a process of waiting for the waiting time Tj set for the station Hj, and transmits an instruction to instruct the target vehicle 20i to depart from the station Hj when the waiting time Tj has elapsed.

Further, the spacing adjustment unit 104 of the operation management device 10 according to the present embodiment has been described as acquiring the congestion information from the predetermined information source. As described above, the predetermined information source is, for example, a host of a passenger attracting event, and the congestion information is passenger pre-attracting information (for example, an event schedule or the expected number of passengers) for the passenger attracting event sent from the host in advance.

Further, the congestion information may be detection information that is acquired from detection means that is installed in a passage from a passenger attracting place in a facility such as a stadium to a nearest station (referred to as a buffer zone) and detects the number and flow of passengers who use the passage (for example, a video projected from a monitoring camera). A manager of the vehicular traffic system 1 monitors the monitoring camera that is a congestion degree prediction unit 5, and thus, can predict a time until congestion occurs in the nearest station (destination station H10) in advance. Further, the information may be, for example, detection information acquired from a passage detection sensor provided at a predetermined position (for example, a gate) of the passage, rather than the video from the monitoring camera.

Further, when the vehicular traffic system 1 communicates with another traffic network, the congestion information may be information indicating a scheduled arrival time of a transport medium regarding the other transportation network, and a scheduled number of arrival passengers. For example, when the vehicular traffic system 1 is a transportation system that connects an airport terminal, demand for the vehicular traffic system 1 increases or decreases according to an aircraft take-off and landing schedule. Accordingly, in this case, the predetermined information source is an aircraft operating company, and the congestion information is the take-off and landing schedule or the number of passengers (boarding rate) of the aircraft.

(Function of Spacing Adjustment Unit)

Figure 13:
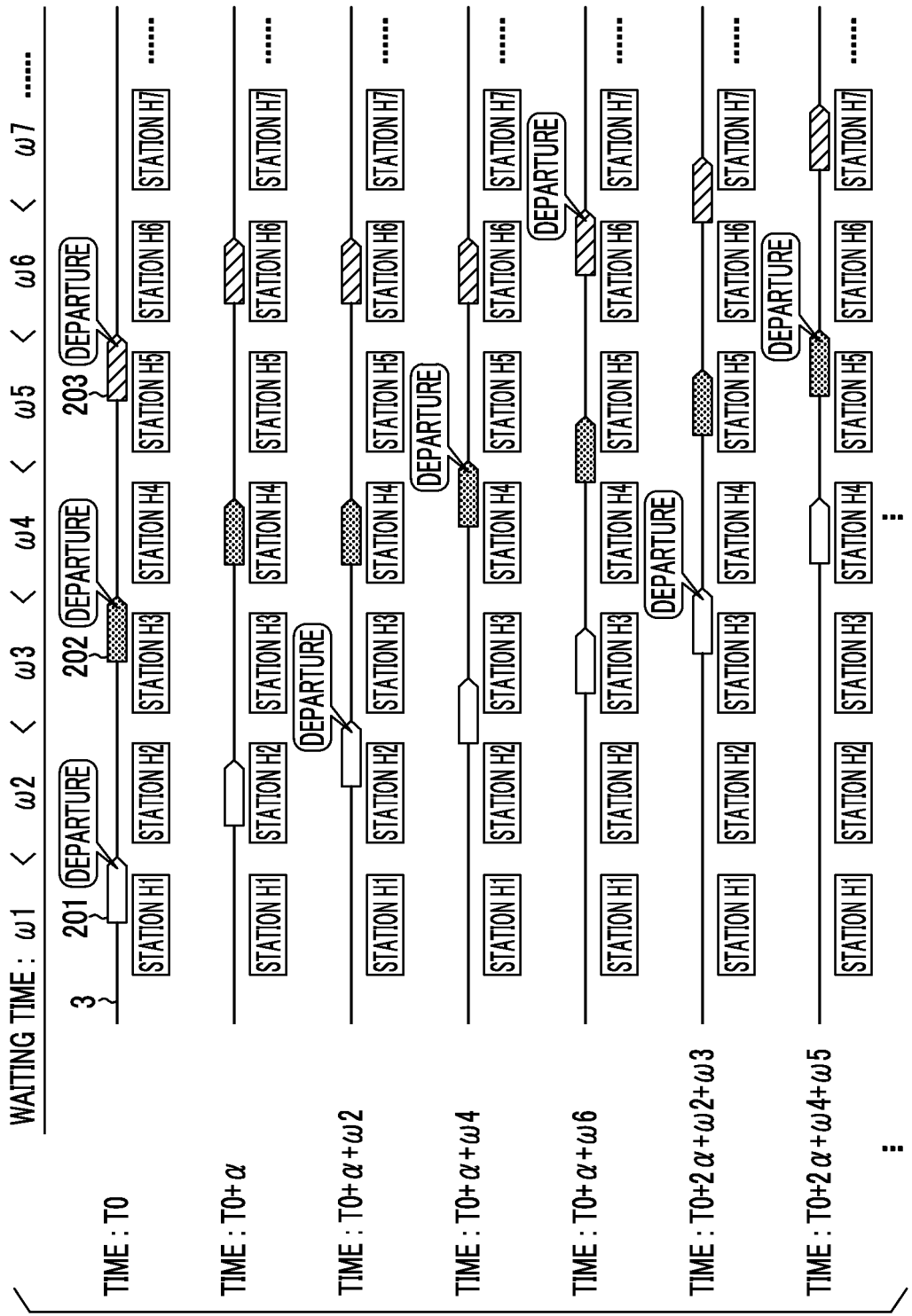
FIG. 13 is a first diagram illustrating a function of a spacing adjustment unit according to the fifth embodiment of the present invention.

FIG. 13 is a first diagram illustrating a function of the spacing adjustment unit according to the fifth embodiment of the present invention. The vehicles 201 to 203 illustrated in FIG. 13 are vehicles that travel along the track 3 while stopping at the stations in an order of the stations H1, H2, . . . , and H7 from the left of a paper surface to the right. Further, each of the vehicles 201 to 20n also stops at stations (not illustrated in FIG. 13; stations H8, H9, H10, . . . ) subsequent to the station H7. Further, it is assumed for convenience of description that the stations H1 to H10 are all installed at equal intervals, and the vehicles 201 to 203 travel at equal speed between the stations. Further, in the following description, a time from departure from one station of each of the vehicles 201 to 203 to stop at the next station is assumed to be "α".

Hereinafter, a specific function of the spacing adjustment unit 104 will be described with reference to FIG. 13.

When the spacing adjustment unit 104 specifies a target station (for example, the station H10 (not illustrated in FIG. 13)) on the basis of predetermined congestion information, the spacing adjustment unit 104 sets the waiting times $\omega 1$ to $\omega 9$ at the stations H1 to H9 that are stations at the rear of the destination station H10 at a predetermined timing. Here, the spacing adjustment unit 104 sets the waiting time of the station closer to a reference station (destination station H10) to be longer. More specifically, the spacing adjustment unit 104 sets $\omega 1 < \omega 2 < \omega 3 < \ldots < \omega 9$. However, the spacing adjustment unit 104 sets the minimum waiting time $\omega 1$ not to be below a minimum time Tmin that enables passengers to safely get on or off.

When the spacing adjustment unit 104 sets the waiting times $\omega 1$ to $\omega 9$ at the respective stations H1 to H9, the departure determination unit 102 adjusts the departure time at the respective stations H1 to H9 for all the vehicles 201, 202, and 203 traveling in the section thereof based on the waiting times $\omega 1$ to $\omega 9$. Hereinafter, an operation process of the vehicles 201 to 203 on the basis of the waiting times $\omega 1$ to $\omega 9$ set by the spacing adjustment unit 104 will be described with reference to FIG. 13.

Further, it is assumed that the vehicle 201 departs from the station H1, the vehicle 202 departs from the station H3, and the vehicle 203 departs from the station H5 at the same time (time: T0). Then, the vehicle 201 stops at the station H2, the vehicle 202 stops at the station H4, and the vehicle 203 stops at the station H6 (time: T0+α). Then, the vehicle 201 waits for the waiting time $\omega 2$ at the station H2, and then departs from the station H2 (time: T0+α+$\omega 2$). With a delay, the vehicle 202 waits for the waiting time $\omega 4$ ($> \omega 2$) at the station H4, and then, departs from the station H4 (time: T0+α+$\omega 4$).

Further, with a delay, the vehicle 203 waits for the waiting time $\omega 6$ ($> \omega 4$) at the station H6, and then, departs from the station H6 (time: T0+α+$\omega 6$). As the waiting times at the respective stations have been set to be $\omega 2 < \omega 4 < \omega 6$, vehicle spacing of the vehicles 201 to 203 becomes narrower at this point.

Subsequently, the vehicle 201 waits for the waiting time W3 at the station H3, and then, departs from the station H3 (time: T0+2α+$\omega 2$+$\omega 3$). Then, the vehicle 202 waits for the waiting time $\omega 5$ ($> \omega 3$) at the station H5, and then, departs from the station H5 (time: T0+2α+$\omega 4$+$\omega 5$). At this point, vehicle spacing between the vehicle 201 and the vehicle 202 is further narrowed. Further, the vehicle 203 does not depart from the station H7, and vehicle spacing between the vehicle 202 and the vehicle 203 is also narrowed. Thus, the spacing adjustment unit 104 sets the waiting times $\omega 1$ to $\omega 9$ at the stations H1 to H9, and accordingly, the vehicle spacing of the vehicles 201 to 203 are gradually narrowed as the vehicles 201 to 203 operate.

Figure 14:
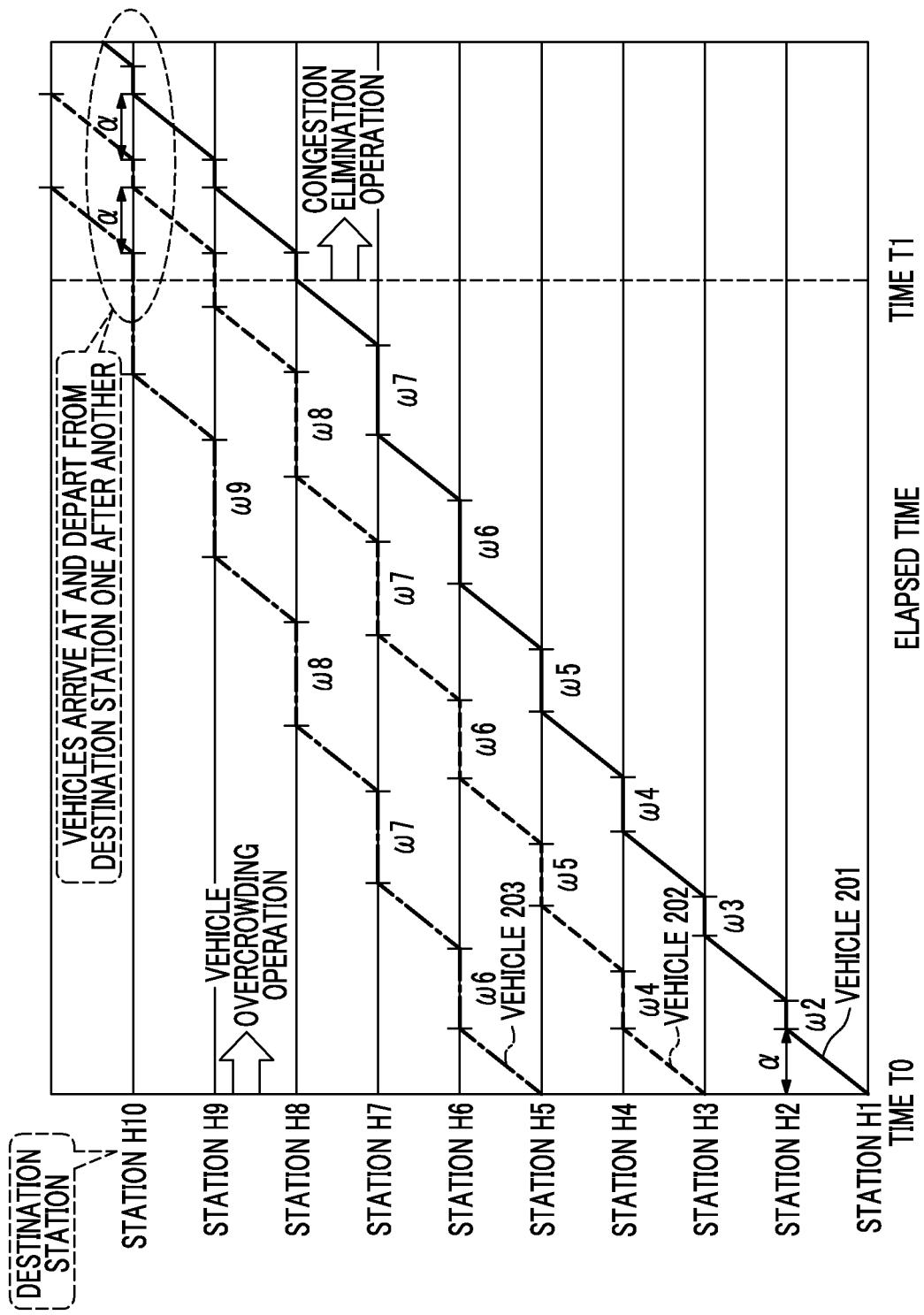
FIG. 14 is a second diagram illustrating a function of the spacing adjustment unit according to the fifth embodiment of the present invention.

FIG. 14 is a second diagram illustrating a function of the spacing adjustment unit according to the fifth embodiment of the present invention. In graphs illustrated in FIG. 14, a horizontal axis indicates an elapsed time from time T0, and a vertical axis indicates a position (a station and between stations) in which each of the vehicles 201 to 203 is present. As illustrated in FIG. 14, for example, the vehicle 201 departs from the station H1, the vehicle 202 departs from the station H3, and the vehicle 203 departs from the station H5 at time T0, and the respective vehicles arrive at the next station at time T0+α.

As illustrated in FIG. 14, the vehicle 201 travels while waiting for the waiting times $\omega 2$ to $\omega 7$ set for the respective stations H2 to H7 at the stations H2 to H7. The vehicles 202 and 203 similarly travel while waiting for the waiting time set for the respective stations (vehicle overcrowding operation). As a result of this vehicle overcrowding operation, an inter-vehicle distance of each of the vehicles 201, 202, and 203 is gradually narrowed from time T0 to time T1. Also, a state in which the vehicles 203, 202, and 201 are dense at the destination station H10 and the stations H9 and H8 at the rear of the destination station (a vehicle overcrowding state) is completed at time T1, as illustrated in FIG. 14.

When the vehicle overcrowding state is completed, the operation management device 10 switches the operation of each of the vehicles 201 to 203 from the vehicle overcrowding operation to a congestion elimination operation. Specifically, the vehicles 201 to 203 operate to arrive at and depart from the destination station H10 at a minimum time interval (FIG. 14). Thus, at the destination station H10 at which the number of passengers increases, the vehicles 201 to 203 arrive and depart one after another, and thus, it is possible to resolve the congestion at the destination station H10.

Further, the spacing adjustment unit 104 appropriately sets the values of the vehicle overcrowding operation start time (time T0) and each waiting time $\omega j$ on the basis of the congestion information obtained in advance, as follows.

The spacing adjustment unit 104 sets the waiting time $\omega j$ so that the congestion occurrence time estimated on the basis of the congestion information and a time at which the density of the presence of the vehicles 201 to 20*n* increases match. This will be described in detail with reference to FIG. 14. The spacing adjustment unit 104 detects that the destination station H10 is congested at time T1 in advance based on the congestion information obtained in advance (the spacing adjustment unit 104 estimates the congestion occurrence time to be time T1). Therefore, the spacing adjustment unit 104 sets the start time T0 of the vehicle overcrowding operation and the respective waiting times $\omega 0$ to $\omega 9$ through inverse calculation so that the vehicle overcrowding state is completed at the destination station H10 at time T1 at which congestion is estimated to occur. Thus, the vehicle overcrowding state can be formed in advance according to the time at which the congestion has been estimated in advance (congestion occurrence time) T1, and thus, it is possible to rapidly cope with a sudden increase in passengers.

Further, when the spacing adjustment unit 104 determines that there is a time margin until the time T1 at which the congestion is expected based on, for example, the congestion information obtained in advance, the spacing adjustment unit 104 sets a period of time from time T0 to time T1 to be long, and sets the respective waiting times $\omega 0$ to $\omega 9$ so that the vehicle overcrowding state is gradually formed over the long period of time. That is, even when the operation is switched from an operation based on the normal timetable to an operation based on the vehicle overcrowding operation, the spacing adjustment unit 104 sets the time T0 and the waiting times $\omega 0$ to $\omega 9$ so that an operation schedule does not change rapidly. By doing so, the vehicular traffic system 1 according to the present embodiment can minimize influence on passengers that will get on, on the basis of a normal timetable. On the other hand, if it is determined that there is no time margin, the spacing adjustment unit 104 sets a period of time from time T0 to time T1 to be short and sets the respective waiting times $\omega 0$ to $\omega 9$ so that the vehicle overcrowding state is rapidly formed. In this case, corresponding waiting times $\omega 0$ to $\omega 9$ for decreasing the vehicle spacing in a short time are set. According to the spacing adjustment unit 104 of the present embodiment, since the vehicle overcrowding state can be formed rapidly even when there is no time margin as described above, it is possible to flexibly cope with a case in which the event schedule (for example, event end time) is changed suddenly.

Similarly, the spacing adjustment unit 104 sets the waiting time ωj on the basis of the number of passengers estimated at a reference station (destination station Hm) from the congestion information obtained in advance. This will be described in greater detail with reference to FIG. 14. When the operation is switched to the congestion elimination operation, the spacing adjustment unit 104 sets the waiting times ω1 to ω9 so that the vehicles 201 to 203 arrive and depart one after another at time intervals α at the destination station H10. Here, when the number of passengers estimated at the station H10 is smaller, the spacing adjustment unit 104 sets the values of the waiting times ω1 to ω9 so that the vehicle arrives and departs, for example, at 1.2α intervals or 1.5α intervals. In this case, the spacing adjustment unit 104 sets the waiting times ω1 to ω9 to more slowly increase from ω1 to ω9. Conversely, when there is a larger number of passengers estimated at the station H10, the spacing adjustment unit 104 sets the values of waiting times ω1 to ω9 so that the time interval becomes shorter, and for example, so that the vehicle arrives or departs at 0.8α intervals or 0.5α intervals. In this case, the spacing adjustment unit 104 sets the waiting times ω1 to ω9 to more steeply increase from ω1 to ω9. By doing so, the vehicular traffic system 1 according to the present embodiment can minimize influence on the passengers that will get on, on the basis of a normal timetable in the same manner as described above. Further, when the time interval between arrival and departure at the destination station Hm is adjusted according to the number of passengers as described above, a possible riding amount per one of the respective vehicles 201 to 20n may be considered.

Further, the state in which the respective vehicles 201 to 203 stop at equal intervals at each station in an initial state in which the operation management device 10 starts the vehicle overcrowding operation has been described in the example illustrated in FIGS. 13 and 14. However, in an actual operation, the respective vehicles 201 to 203 are not necessarily present at equal intervals as illustrated in FIGS. 13 and 14 at a timing at which the operation management device 10 starts the vehicle overcrowding operation.

Therefore, when the vehicle overcrowding operation starts, the spacing adjustment unit 104 first recognizes the current positions of the respective vehicles 201 to 203 from the "position information" of the respective vehicles 201 to 203 acquired through the vehicle position acquisition unit 100. Also, the spacing adjustment unit 104 calculates a distance from the current position of each of the vehicles 201 to 203 to the destination station Hm. Here, for example, the position of the vehicle 201 in the initial state is assumed to be away from the destination station Hm as compared to the state illustrated in FIGS. 2 and 3. In this case, when the vehicle 201 waits for the waiting time ωj at each stop station Hj like the other vehicles 202 and 203, the vehicle 201 does not arrive at a place that enters an overcrowded state at time T1, and the overcrowded state cannot be completed. Accordingly, the spacing adjustment unit 104 performs a process of correcting the waiting time ωj at each station Hj for the vehicle 201.

Specifically, when the position of the vehicle 201 in the initial state is away from the destination station Hm as compared to the state illustrated in FIGS. 2 and 3 as in the above-described example, the spacing adjustment unit 104 performs a correction for setting the waiting time ωj for which the vehicle 201 should stop at each stop station Hj to be short for the vehicle 201. Since the waiting time ωj for which the vehicle 201 should stop at each stop station Hj is short, the vehicle 201 can arrive early at a position that should be in the overcrowded state.

As a more specific process example, when the distance from the current position of the vehicle 201 to the destination station Hm is L1, the spacing adjustment unit 104 multiplies each waiting time ωj by a predetermined coefficient p (0<p≤1) that decreases in inverse proportion to an increase in the distance L1.

By doing so, as the distance of the vehicle 201 is away from the set destination station Hm, the waiting time ωj for which the vehicle 201 should wait at each stop station Hj is set to be smaller. Then, the vehicle 201 can arrive at a place that should be in the overcrowded state at time T1 regardless of a position at a time at which the vehicle overcrowding operation starts.

Further, while the case in which the respective stations H1 to H10 are all installed at equal intervals, the vehicles 201 to 203 travel between the stations at the same speed, and times from departure from one station of the respective vehicles 201 to 203 to stop at the next station are all "α" for simplicity has been described in the above description, the present invention is not limited to such an aspect in the actual operation of the vehicular traffic system 1. That is, in the vehicular traffic system 1, the stations Hj may be installed at different intervals at respective stations, and travel times among the stations may be different.

(Process Flow of Operation Management Device According to Fifth Embodiment)

Figure 15:
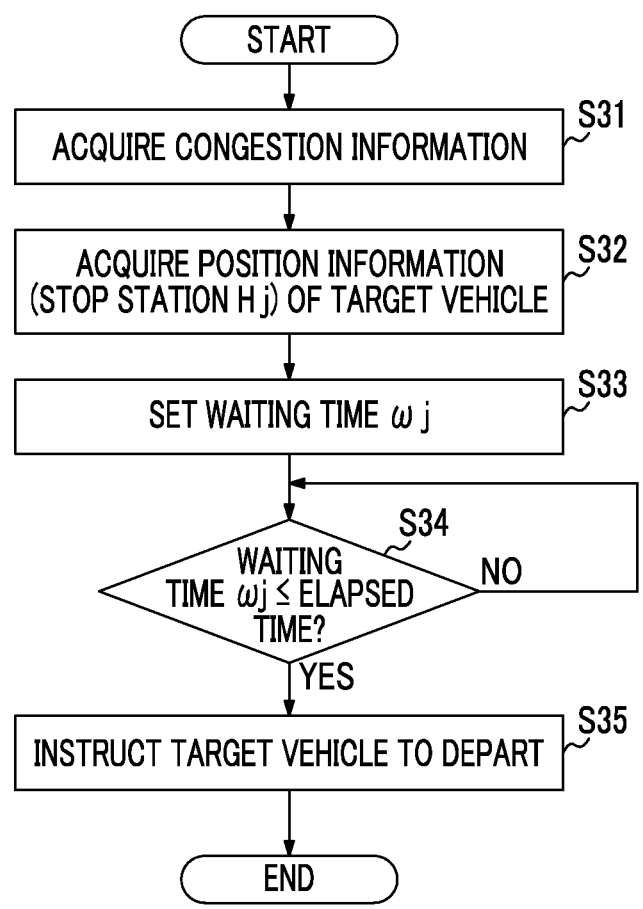
FIG. 15 is a flowchart illustrating a process flow of an operation management device according to the fifth embodiment of the present invention.

FIG. 15 is a flowchart illustrating a process flow of the operation management device according to the fifth embodiment of the present invention.

The operation management device 10 according to the present embodiment executes a process flow (FIG. 15) to be described below using the vehicle position acquisition unit 100, the spacing adjustment unit 104, and the departure determination unit 102 described above.

First, the spacing adjustment unit 104 acquires congestion information on the basis of a determination of a manager who obtains predetermined event information in advance (step S31). The congestion information is information indicating, for example, an expected number of passengers, an expected congestion occurrence time, and a station at which the congestion occurs.

Then, the vehicle position acquisition unit 100 acquires position information indicating a position in which a specific target vehicle 20i is present (step S32). Here, the vehicle position acquisition unit 100 receives and acquires the position information indicating the position of the own vehicle from the target vehicle 20i.

Next, the spacing adjustment unit 104 sets the start time T0 of the vehicle overcrowding operation and the waiting time ωj for each station Hj on the basis of the congestion information acquired in step S31 and the position information acquired in step s32 (step S33). Here, the spacing adjustment unit 104 sets the start time T0 and a basic waiting time ωj' for each stop station Hj to gradually increase as the vehicle approaches the destination station Hm on the basis of the congestion information. Also, the spacing adjustment unit 104 performs correction according to the position information of each of the vehicles 201 to 20n (multiplies the basic waiting time ωj' by the coefficient p) to calculate the waiting time ωj for each station Hj for each of the vehicles 201 to 20n.

Also, the departure determination unit 102 executes a process in which the target vehicle 20i waits for the waiting time ωj at the stop station Hj on the basis of the waiting time ωj set in step S33. Specifically, the departure determination unit 102 determines whether the elapsed time is equal to or greater than the waiting time ωj after the target vehicle 20i stops at the station Hj (step S34). When the elapsed time is less than the waiting time ωj (NO in step S34), the departure determination unit 102 repeats step S34 to suspend the transmission of the departure instruction to the target vehicle 20i. Also, when the elapsed time is equal to or greater than the waiting time ωj (YES in step S34), the departure determination unit 102 transmits the departure instruction to the target vehicle 20i (step S35).

Further, in the above-described flowchart, the operation management device 10 executes the process flow from step S33 to step S35 for each of the vehicles 201 to 20n. Further, the operation management device 10 repeats the process flow from step S33 to step S35 for each stop station Hj for one target vehicle 20i.

The operation management device 10 according to the present embodiment executes the process flow (FIG. 15), and thus, a state in which density of the presence of the vehicles 201 to 20n increases at the congestion occurrence station (station Hm) at a congestion occurrence time (time T1) is formed. Further, the density of the presence of the vehicles 201 to 20n in this case is set so that a supply and demand balance is suitable according to the expected number of passengers.

As described above, according to the vehicular traffic system 1 of the fifth embodiment of the present invention, density of provision of a transportation service using the vehicles can be flexibly changed at a desired time and at a desired station.

Further, the spacing adjustment unit 104 according to the fifth embodiment described above has been described as setting the waiting time ωj to gradually increase at the station closer to the destination station Hm, the vehicular traffic system 1 according to the present embodiment is not limited to such a process. The spacing adjustment unit 104 may appropriately set the waiting time ωj at each station Hj according to original characteristics of the vehicular traffic system 1. For example, in the example illustrated in FIG. 14, when there normally are a large number of passengers at a specific station (for example, station H6), the waiting time ω6 may be set to be smaller than the waiting times ω1 to ω5 on the basis of a vehicle overcrowding operation at the station H6. The spacing adjustment unit 104 may set another waiting time ωj so that the vehicle overcrowding state is formed at the destination station H10 after performing such exceptional coping.

Further, the spacing adjustment unit 104 may set the waiting time ωj according to a normal stop time that is determined for each station in a normal operation in advance. For example, when a normal waiting time Td1 at the station H1, a normal waiting time Td2 at the station H2, . . . have been determined in the normal operation, the spacing adjustment unit 104 sets ω1=Td1×r1, ω2=Td2×r2, . . . . Here, r1, r2, . . . are values equal to or greater than 1. In this case, the spacing adjustment unit 104 sets r1<r2< . . . . By doing so, the spacing adjustment unit 104 can form the vehicle overcrowding state even when the stop times at respective stations in the normal operation are different.

Further, the spacing adjustment unit 104 according to the fifth embodiment described above sets the waiting time ωj at the station Hj closer to the destination station Hm to gradually increase to form the vehicle overcrowding state, but the vehicular traffic system 1 according to the present embodiment is not limited to such a process. For example, the spacing adjustment unit 104 may gradually decrease a travel speed between the respective stations closer to the destination station Hm to form the vehicle overcrowding state at the destination station Hm at a desired time.

Sixth Embodiment

Next, a vehicular traffic system according to a sixth embodiment of the present invention will be described.

Figure 16:
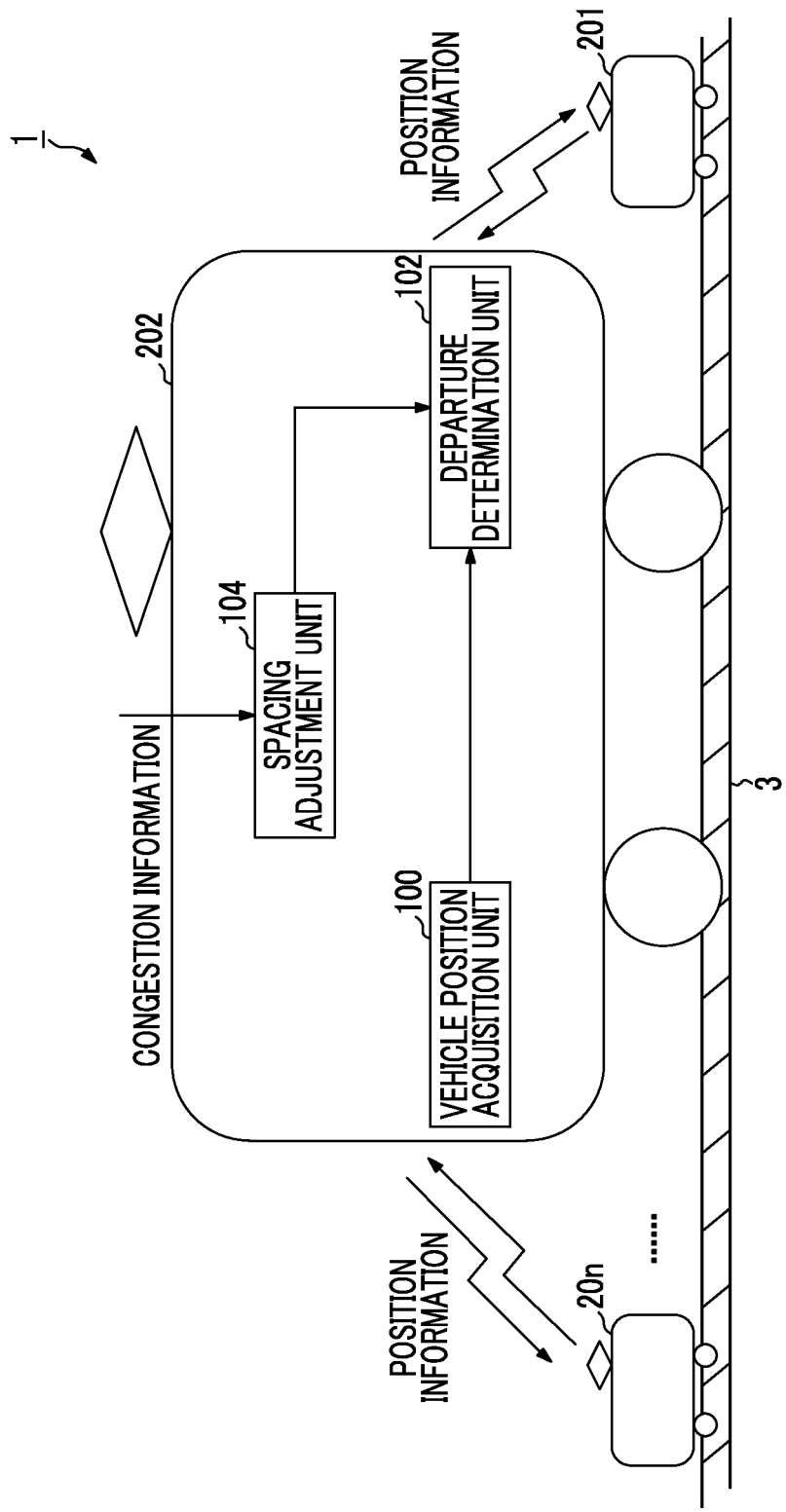
FIG. 16 is a diagram illustrating a functional configuration of a vehicular traffic system according to a sixth embodiment of the present invention.

FIG. 16 is a diagram illustrating a functional configuration of a vehicular traffic system according to the sixth embodiment of the present invention. Among the functional components of the vehicular traffic system 1 according to the sixth embodiment, the same functional components as the vehicular traffic system 1 (FIG. 12) according to the fifth embodiment are denoted with the same reference signs, and description thereof is omitted.

The vehicular traffic system 1 according to the sixth embodiment of the present invention does not include the operation management device 10 that is a ground facility in the fifth embodiment. Also, each of the vehicles 201 to 20n includes the vehicle position acquisition unit 100, the spacing adjustment unit 104, and the departure determination unit 102 included in the operation management device 10 in the fifth embodiment (further, for convenience, although functional components of only the vehicle 202 are shown in FIG. 16, in fact, each of the vehicles 201 to 20n includes the same functional components as the vehicle 202).

Here, according to the vehicular traffic system 1 of the present embodiment, each of the vehicles 201 to 20n can autonomously perform a vehicle overcrowding operation while communicating with the other vehicles 201 to 20n. Specifically, the spacing adjustment unit 104 of each of the vehicles 201 to 20n acquires the same congestion information from the predetermined information source (for example, an event manager) described above (step S31 in FIG. 15). Further, a station estimated to be congested (destination station Hm) and a time at which congestion is estimated (congestion occurrence time T1) are assumed to be included in this congestion information.

Then, the vehicle position acquisition unit 100 of each of the vehicles 201 to 20n acquires position information indicating the position in which the own vehicle is present (step S32 in FIG. 15). Here, the vehicle position acquisition unit 100 acquires a current position of the own vehicle on the basis of the number of tire rotations and the information received from the position detection device, and acquires position information for another vehicle through communication means with the other vehicle.

Next, the spacing adjustment unit 104 of each of the vehicles 201 to 20n sets a start time T0 of the vehicle overcrowding operation and the waiting time ωj for each station Hj on the basis of the congestion information acquired in step S31 and the position information of each of the vehicles 201 to 20n acquired in step S32 (step S33 in FIG. 15). Here, the spacing adjustment unit 104 sets the start time T0 and a basic waiting time ωj' for each stop station Hj to gradually increase as the vehicle approaches the destination station Hm on the basis of the congestion information. Also, the spacing adjustment unit 104 performs correction according to the position information of the own vehicle (multiplies the basic waiting time ωj' by the coefficient p) to calculate the waiting time ωj for each stop station Hj for the own vehicle.

Also, the departure determination unit 102 executes a process of waiting for the waiting time ωj at the stop station Hj of the own vehicle on the basis of the waiting time ωj set in step S33. Specifically, the departure determination unit 102 determines whether the elapsed time is equal to or greater than the waiting time ωj after the own vehicle stops at the station Hj (step S34 in FIG. 15). When the elapsed time is less than the waiting time ωj (NO in step S34 of FIG. 15), the departure determination unit 102 repeats step S34 to suspend the departure instruction of the own vehicle. Also, when the elapsed time is equal to or greater than the waiting time ωj (YES in step S34 of FIG. 15), the departure determination unit 102 transmits the departure instruction to the own vehicle (step S35 in FIG. 15).

As described above, according to the vehicular traffic system 1 of the present embodiment, each of the vehicles 201 to 20n can autonomously execute the vehicle overcrowding operation on the basis of the determined waiting time ωj. Accordingly, it is not necessary to perform the operation using a ground facility (operation management device 10) that centrally manages the entire operation of the vehicles 201 to 20n, and it is possible to achieve distribution of the operation management process. If the distribution of the operation management process is made in this way, influence on the operation of the vehicular traffic system 1 is minimized even when any of the respective operation management systems (the vehicles 201 to 20n in the case of the present embodiment) fails, and thus, it is possible to improve the reliability of the entire vehicular traffic system 1.

Further, the vehicular traffic system 1 according to the fifth and sixth embodiments may further include a passenger information system (PIS) as a ground facility. A conventional PIS displays a scheduled arrival time of a vehicle on a screen provided at a station on the basis of a predetermined timetable, whereas in the case of the vehicular traffic system 1 according to the present embodiment, since the operation (the vehicle overcrowding operation and the congestion elimination operation) that does not use the timetable is performed, an arrival vehicle and an arrival time cannot be recognized on the basis of only timetable information. Therefore, the PIS according to the present embodiment performs a process of receiving the identification information, the position information, the path information, and the waiting time ωj at each station of the target vehicle 20i from the operation management device 10 (each of the vehicles 201 to 20n in the case of the sixth embodiment), calculating the scheduled arrival time for each station of the target vehicle 20i, and displaying the scheduled arrival time on a display screen installed in each station. Here, the identification information of the target vehicle 20i may be a unique ID (IDentification) number or the like for specifying the target vehicle 20i. After specifying the target vehicle 20i from the identification information, the PIS according to the present embodiment can easily estimate a time required until at least the next stop station from, for example, a travel speed of the target vehicle 20i when the position information and the path information can be recognized.

Figure 17:
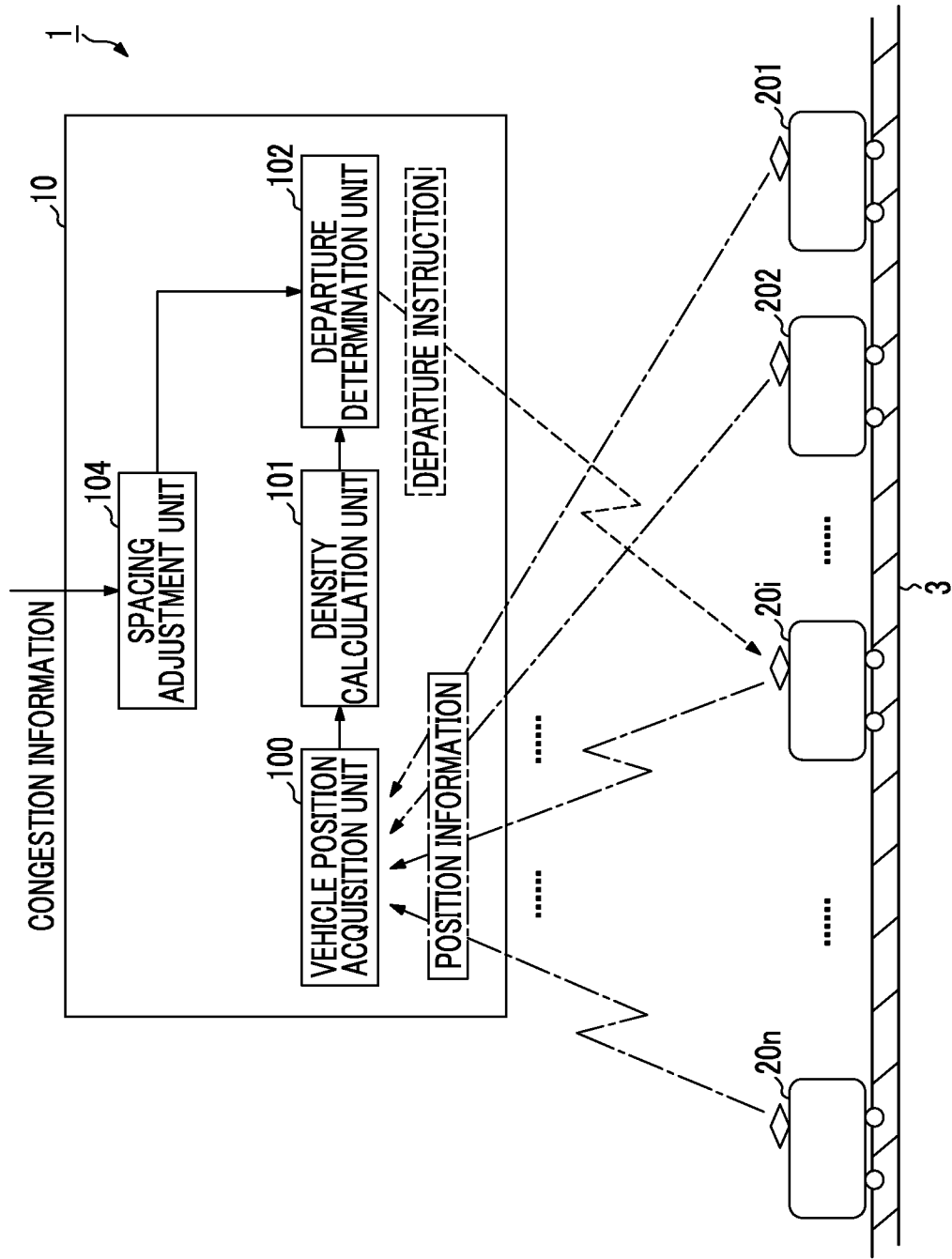
FIG. 17 is a diagram illustrating a functional configuration of a vehicular traffic system according to a seventh embodiment of the present invention.
Figure 18:
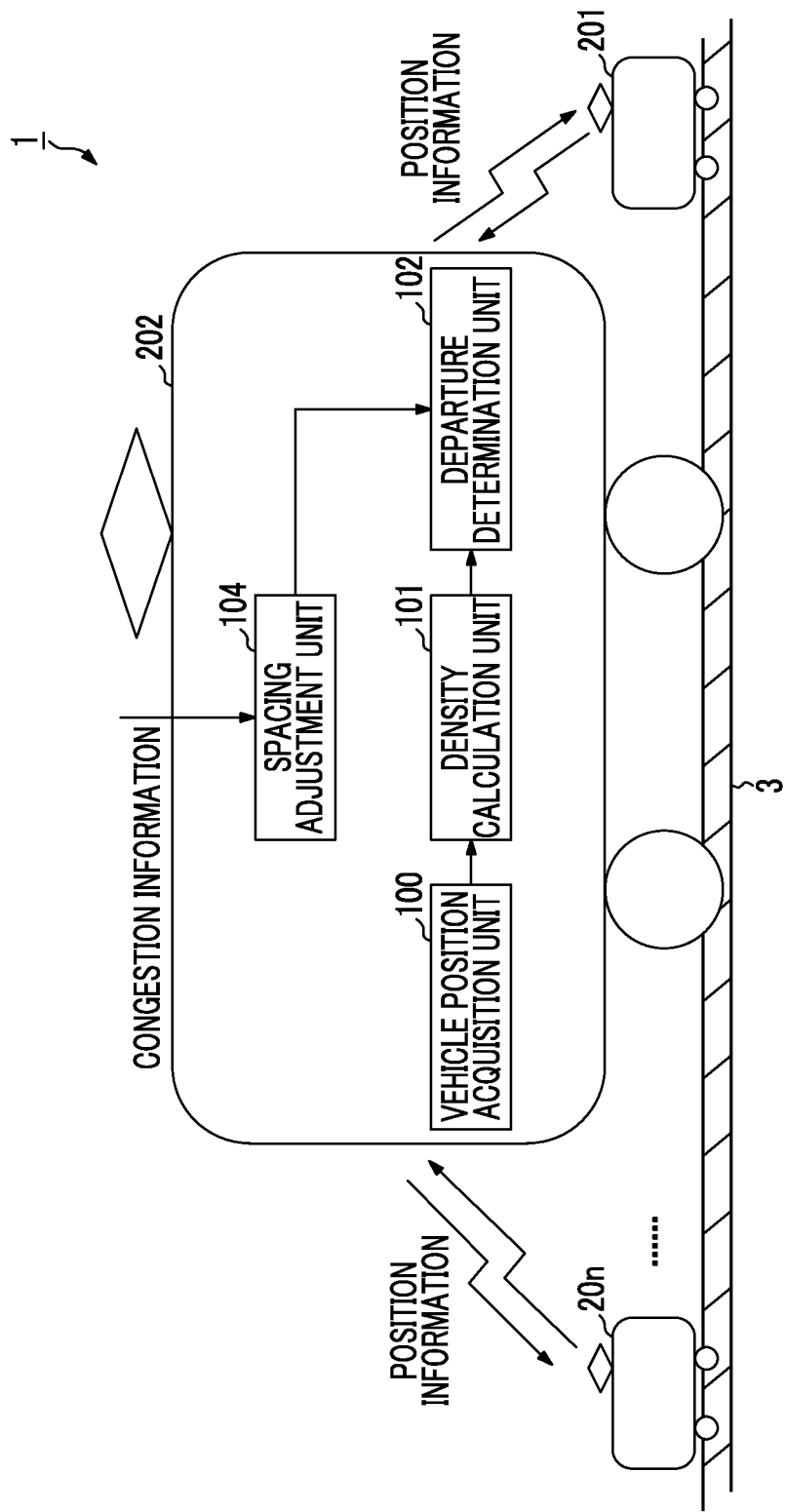
FIG. 18 is a diagram illustrating a functional configuration of a vehicular traffic system according to an eighth embodiment of the present invention.

FIG. 17 is a diagram illustrating a functional configuration of a vehicular traffic system according to a seventh embodiment of the present invention. FIG. 18 is a diagram illustrating a functional configuration of a vehicular traffic system according to an eighth embodiment of the present invention.

As illustrated in FIG. 17, the operation management device 10 according to the seventh embodiment of the present invention may include both of the function of the density calculation unit 101 according to the first embodiment described above, and the function of the spacing adjustment unit 104 according to the fifth embodiment. Further, in this case, the departure determination unit 102 of the operation management device 10 according to the present embodiment may include both of the function of the departure determination unit 102 according to the first embodiment and the function of the departure determination unit 102 according to the fifth embodiment.

Further, if the operation management device 10 has the functions of both of the first embodiment and the fifth embodiment, when the functions of the density calculation unit 101 and the departure determination unit 102 according to the first embodiment are valid, the functions of the spacing adjustment unit 104 and the departure determination unit 102 according to the fifth embodiment may be invalid. Similarly, when the functions of the spacing adjustment unit 104 and the departure determination unit 102 according to the fifth embodiment are valid, the functions of the density calculation unit 101 and the departure determination unit 102 according to the first embodiment may be invalid. By doing so, the operation management device 10 can perform the operation while appropriately selecting the function of uniformizing the vehicle spacing according to the first embodiment and the function of changing the vehicle density according to the fifth embodiment.

Further, as illustrated in FIG. 18, the vehicles 201 to 20n according to the eighth embodiment of the present invention may include both of the function of the density calculation unit 101 according to the fourth embodiment described above, and the function of the spacing adjustment unit 104 according to the sixth embodiment. Further, in this case, the departure determination unit 102 of the vehicles 201 to 20n according to the present embodiment may include both of the function of the departure determination unit 102 according to the fourth embodiment and the function of the departure determination unit 102 according to the sixth embodiment.

Further, when the vehicles 201 to 20n have the functions of both of the fourth embodiment and the sixth embodiment, if the functions of the density calculation unit 101 and the departure determination unit 102 according to the fourth embodiment are valid, the functions of the spacing adjustment unit 104 and the departure determination unit 102 according to the sixth embodiment may be invalid. Similarly, when the functions of the spacing adjustment unit 104 and the departure determination unit 102 according to the sixth embodiment are valid, the functions of the density calculation unit 101 and the departure determination unit 102 according to the fourth embodiment may be invalid. By doing so, the respective vehicles 201 to 20n can operate while appropriately selecting the function of uniformizing the vehicle spacing according to the fourth embodiment and the function of changing the vehicle density according to the sixth embodiment.

Figure 19:
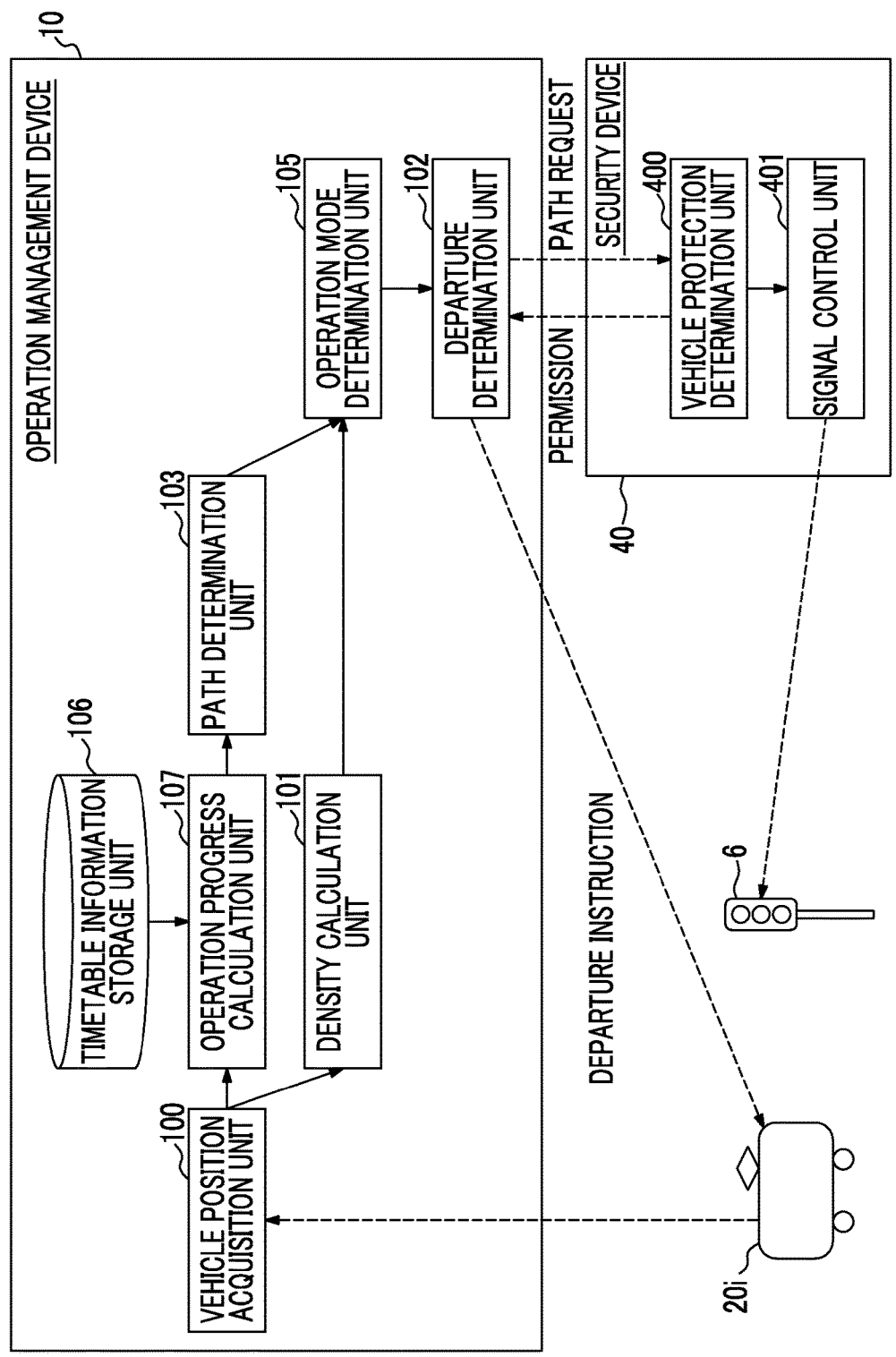
FIG. 19 is a diagram illustrating a functional configuration of a vehicular traffic system according to another embodiment.

FIG. 19 is a diagram illustrating a functional configuration of a vehicular traffic system according to another embodiment.

The operation management device 10 described in each embodiment described above has been described as a functional unit that simply transmits the departure instruction to each of the vehicles 201, 202, . . . , and 20n on the basis of the determination of the departure determination unit 102. Also, each of the vehicles 201 to 20n has been assumed to operate on the basis of the departure instruction received from the operation management device 10.

However, in an actual operation of the operation management device 10, the operation management device 10 may further include an operation progress calculation unit 107, an operation mode determination unit 105, and a timetable information storage unit 106, as illustrated in FIG. 19.

The operation progress calculation unit 107 is a functional unit that compares the position information of each of the vehicles 201 to 20n acquired by the vehicle position acquisition unit 100 with the operation timetable information stored in the timetable information storage unit 106, and calculates progress information indicating progress of an actual operation of each of the vehicles 201 to 20n. Further, the earliest departure time determined for each vehicle and each station in advance is recorded in the operation timetable information stored in the timetable information storage unit 106. This earliest departure time is an earliest time at which each vehicle should depart from each station, which is determined on the basis of the operating timetable. The path determination unit 103 can specify the path along which each of the vehicles 201 to 20n should then progress at a current time by referring to the progress information calculated by the operation progress calculation unit 107.

The operation mode determination unit 105 is a functional unit that sets an operation mode of each of the vehicles 201 to 20n on the basis of the front and rear direction density difference ΔD (or, the front direction density Df and the rear direction density Dr) calculated by the density calculation unit 101. Here, the operation mode determined by the operation mode determination unit 105 includes a "normal operation mode", a "spacing adjustment mode", and an "overcrowding operation mode".

In the normal operation mode, the operation management device 10 performs operation control based on the operation timetable information, as in a conventional case. In this case, after the operation progress calculation unit 107 has determined whether the vehicles 201 to 20n can operate according to the timetable of the vehicles 201 to 20n, the path determination unit 103 selects a predetermined path for the target vehicle 20i according to a result of the determination. Also, the departure determination unit 102 transmits the departure instruction according to the departure time (earliest departure time).

On the other hand, in the spacing adjustment mode, the operation management device 10 performs operation control to adjust the vehicle spacing on the basis of the front direction density Df and the rear direction density Dr described in the first to fourth embodiments.

Further, in the overcrowding operation mode, the operation management device 10 performs operation control to intentionally form the overcrowded state at time T1 and the destination station Hm on the basis of the congestion information described in the fifth to sixth embodiments.

For example, when the front and rear direction density difference ΔD is equal to or less than the density difference threshold value α, the operation mode determination unit 105 performs operation control in the normal operation mode (that is, the target vehicle 20i departs from each station according to the operation timetable). On the other hand, when the front and rear direction density difference ΔD is greater than the density difference threshold value α, the operation management device 10 proceeds to operation control in the spacing adjustment mode for adjusting the vehicle spacing.

By doing so, when the delay of the operation does not occur, the operation management device 10 can provide an operation service according to the predetermined timetable.

Further, when the departure determination unit 102 proceeds to the operation control of the spacing adjustment mode, the departure time of the target vehicle 20i is adjusted on the basis of the front direction density Df and the rear direction density Dr, as described above. In this case, the departure determination unit 102 may adjust the departure time of the target vehicle 20i in the spacing adjustment mode not to be a time earlier than an earliest departure time that is a time at which the target vehicle 20i should originally depart from the station.

Thus, since the operation management device 10 can prevent the target vehicle 20i from departing from the station at a time earlier than an original departure time, the passenger can be prevented from missing the vehicle on which the passenger is scheduled to get.

Further, the operation mode determination unit 105 starts the operation control to immediately switch to the overcrowding operation mode at a timing at which the predetermined congestion information is received to form the overcrowded state.

Further, in the actual operation of the operation management device 10, a process of the security device (interlocking device) 40 and the signal 6 may also be present between the instruction of the operation management device 10 and the operation of each of the vehicles 201 to 20n, as illustrated in FIG. 19.

Here, in a general operation management device, all vehicles are tracked and positions thereof are recognized so as to recognize the progress of the operation of each vehicle for a predetermined operation timetable. Also, the operation management device delivers a path request to the security device (also referred to as an interlocking device) on the basis of the progress of the operation of each vehicle for the operation timetable. Here, the security device is an operation control device that performs control of the operation while securing safety of each vehicle. Also, when the security device receives the path request from the operation management device, the security device determines whether the vehicle can depart in terms of safety. Here, when the security device permits the departure, the security device sets the signal corresponding to the path to blue and the vehicle can depart. When this signal remains red, the vehicle continues to stop.

Hereinafter, a process of displaying blue or red in the signal corresponding to the path of the security device 40 is represented as permitting or not permitting the progress to the path.

In this case, before the departure instruction is transmitted to the target vehicle 20i, the departure determination unit 102 performs a process of transmitting a path request for the path along which the target vehicle 20i should progress, which has been specified by the path determination unit 103, to the security device 40 on the basis of the path information of the track 3, and obtaining a permission of the progress.

Here, the security device 40 includes a vehicle protection determination unit 400, and a signal control unit 401, as illustrated in FIG. 19.

When the vehicle protection determination unit 400 receives the path request for the path along which the target vehicle 20i will progress from the operation management device 10, the vehicle protection determination unit 400 determines whether the target vehicle 20i is caused to progress along the path in terms of safety. Since the vehicle protection determination unit 400 is a known technology, a specific function thereof is omitted. For example, when another vehicle is present at a progress destination, the vehicle protection determination unit 400 does not permit progress of the target vehicle 20*i*, but permits the progress of the target vehicle 20*i* after the other vehicle disappears from the place.

Further, the path determination unit 103 specifies a path along which the target vehicle 20*i* will progress on the basis of the calculation result of the operation progress calculation unit 107. In this case, when a plurality of path candidates can be selected, the path determination unit 103 may output the path candidates and information indicating a priority determined for each path in advance to the departure determination unit 102. In this case, the departure determination unit 102 may perform a process of transmitting a path request for each path candidate to the security device 40 according to the given priority.

The signal control unit 401 is a functional unit that actually performs control of switching the signal 6 corresponding to the path to blue or red according to permission or non-permission of the progress to the path in response to the path request received by the vehicle protection determination unit 400.

As described above, the operation management device 10 may perform the operation control on the basis of each embodiment described above in a situation in which safety is ensured on the basis of the control of the security device 40. Thus, for example, the departure instruction according to the front direction density Df and the rear direction density Dr that is transmitted by the departure determination unit 102 in the spacing adjustment mode is generated after a condition that safety based on control of the security device 40 is ensured is satisfied. Accordingly, the vehicular traffic system 1 can exhibit each function in each embodiment described above while securing high safety.

Further, the operation management device 10 described above has a computer system provided therein. Also, each process of the operation management device 10 described above is stored in the form of a program in a computer-readable recording medium, and the computer reads and executes the program to perform the above process. Here, the computer-readable recording medium refers to a magnetic disk, a magneto optical disc, a CD-ROM (Compact Disc Read Only Memory), a semiconductor memory, or the like. Further, this computer program may be distributed to a computer via a communication line, and the computer which has received the distribution may execute the program.

INDUSTRIAL APPLICABILITY

According to the operation management device, the operation management method, the vehicle, the vehicular traffic system, and the program, when the provision of the transportation service using vehicles becomes nonuniform, an effect of resolving this can be obtained more rapidly. Further, even when an unexpected event, such as a case in which a certain vehicle is suddenly withdrawn to the vehicle depot or a case in which there is a failure vehicle on the line, occurs, it is possible to continue the operation without performing adjustment of the timetable.

REFERENCE SIGNS LIST 1 vehicular traffic system
10 operation management device
100 vehicle position acquisition unit
101 density calculation unit
102 departure determination unit
103 path determination unit
104 spacing adjustment unit
105 operation mode determination unit
106 timetable information storage unit
107 service progress calculation unit
200 to 20*n* vehicle
3 (3*a*, 3*b*, 3*c*) track

The invention claimed is:

1. An operation management device that manages an operation of a plurality of vehicles traveling along a track, the operation management device comprising:
a vehicle position acquisition unit that acquires positions of the plurality of vehicles present on the track;
a density calculation unit that calculates density of the plurality of vehicles traveling within a predetermined range on the track; and
a departure determination unit that adjusts a departure time of a predetermined target vehicle by changing a time to transmit a departure instruction to the target vehicle on the basis of one or both of:
front direction density indicating density of vehicles traveling in a range which is defined ahead of the target vehicle within a predetermined distance therefrom and moves with the target vehicle, and
rear direction density indicating density of vehicles traveling in a range which is defined behind the target vehicle within a predetermined distance therefrom and moves with the target vehicle.

2. The operation management device according to claim 1,
wherein the departure determination unit adjusts the departure time at a stop station of the target vehicle on the basis of a magnitude relationship between the front direction density and a predetermined front direction density threshold value.

3. The operation management device according to claim 1,
wherein the departure determination unit adjusts the departure time at a stop station of the target vehicle on the basis of a magnitude relationship between the rear direction density and a predetermined rear direction density threshold value.

4. The operation management device according to claim 1,
wherein the departure determination unit delays the departure time at the stop station of the target vehicle when a front and rear direction density difference that is a value obtained by subtracting the rear direction density from the front direction density is greater than a predetermined density difference threshold value.

5. The operation management device according to claim 1,
wherein the departure determination unit further adjusts the departure time at the stop station of the target vehicle on the basis of one or both of an inter-vehicle distance between the target vehicle and another vehicle traveling in a nearest position in front in a travel direction of the target vehicle and an inter-vehicle distance between the target vehicle and another vehicle traveling in a nearest position at the rear in the travel direction.

6. The operation management device according to claim 1,
wherein the vehicle position acquisition unit further acquires a travel direction of the plurality of vehicles, and
the density calculation unit performs a correction to increase the front direction density when it is determined that there is a vehicle traveling in a direction opposite to the travel direction of the target vehicle, in front in the travel direction on the track along which the target vehicle travels.

7. The operation management device according to claim 1,
wherein the departure determination unit further adjusts the departure time not to be a time earlier than an earliest departure time determined for each vehicle and each station by referring to operation timetable information in which the earliest departure time has been recorded.

8. The operation management device according to claim 1,
wherein the departure determination unit further obtains permission of progress for a security device that performs control of the operation while securing safety for a path along which the target vehicle should progress, the path being specified on the basis of path information of the track, before transmitting the departure instruction to the target vehicle.

9. A vehicular traffic system comprising:
the operation management device according to claim 1; and
a passenger information system that receives identification information, position information, and path information of the target vehicle from the operation management device, calculates a scheduled arrival time for each station of the target vehicle, and displays the calculated scheduled arrival time on a display screen installed in each station.

10. A vehicle that travels along a track, comprising:
a vehicle position acquisition unit that acquires positions of a plurality of vehicles including an own vehicle present on the track;
a density calculation unit that calculates density of the plurality of vehicles traveling within a predetermined range on the track; and
a departure determination unit that adjusts a departure time at a stop station of the own vehicle on the basis of one or both of:
front direction density indicating density of other vehicles traveling in a range which is defined ahead of the own vehicle within a predetermined distance therefrom and moves with the own vehicle, and
rear direction density indicating density of other vehicles traveling in a range which is defined behind the own vehicle within a predetermined distance therefrom and moves with the own vehicle.

11. An operation management method for managing an operation of a plurality of vehicles traveling along a track, the operation management method comprising the steps of:
acquiring, by a vehicle position acquisition unit, positions of the plurality of vehicles present on the track;
calculating, by a density calculation unit, front direction density indicating density of vehicles traveling in a range which is defined ahead of a target vehicle within a predetermined distance therefrom and moves with the target vehicle, and rear direction density indicating density of vehicles traveling in a range which is defined behind the target vehicle within a predetermined distance therefrom and moves with the target vehicle; and
adjusting, by a departure determination unit, a departure time at a stop station of the target vehicle on the basis of one or both of the front direction density and the rear direction density.

12. A non-transitory computer-readable medium having a program recorded thereon, and upon execution of the program, causing a computer of an operation management device that manages an operation of a plurality of vehicles traveling along a track to function as:
vehicle position acquisition means for acquiring positions of the plurality of vehicles present on the track;
density calculation means for calculating density of the plurality of vehicles traveling within a predetermined range on the track; and
time adjustment means for adjusting a departure time at a stop station of a predetermined target vehicle on the basis of one or both of:
front direction density indicating density of vehicles traveling in a range which is defined ahead of the target vehicle within a predetermined distance therefrom and moves with the target vehicle, and
rear direction density indicating density of vehicles traveling in a range which is defined behind the target vehicle within a predetermined distance therefrom and moves with the target vehicle.

* * * * *